US008866582B2

(12) United States Patent
Verfuerth et al.

(10) Patent No.: US 8,866,582 B2
(45) Date of Patent: Oct. 21, 2014

(54) OUTDOOR FLUORESCENT LIGHTING FIXTURES AND RELATED SYSTEMS AND METHODS

(75) Inventors: Neal R. Verfuerth, Plymouth, WI (US); Kenneth J. Wetenkamp, Plymouth, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 1018 days.

(21) Appl. No.: 12/875,930

(22) Filed: Sep. 3, 2010

(65) Prior Publication Data

US 2011/0060701 A1 Mar. 10, 2011

Related U.S. Application Data

(60) Provisional application No. 61/275,985, filed on Sep. 4, 2009.

(51) Int. Cl.

| | |
|---|---|
| ***G05B 19/00*** | (2006.01) |
| ***F21S 8/08*** | (2006.01) |
| ***G06Q 99/00*** | (2006.01) |
| ***F21V 21/116*** | (2006.01) |
| *F21Y 103/00* | (2006.01) |
| *F21S 8/00* | (2006.01) |
| *F21W 131/103* | (2006.01) |
| *F21W 131/10* | (2006.01) |

(52) U.S. Cl.

CPC .............. *F21S 8/086* (2013.01); *F21Y 2103/00* (2013.01); *F21S 8/033* (2013.01); *F21W 2131/103* (2013.01); *F21W 2131/10* (2013.01); *G06Q 99/00* (2013.01); *F21V 21/116* (2013.01)

USPC .......................................................... 340/5.61

(58) Field of Classification Search

USPC ............... 315/149–155; 340/4.41, 4.42, 4.61, 340/4.62, 5.61, 13.23, 13.24, 13.25

See application file for complete search history.

(56) References Cited

U.S. PATENT DOCUMENTS

| | | | |
|---|---|---|---|
| 1,254,520 | A | 1/1918 | MacDuff |
| 2,403,240 | A | 7/1946 | Sawin |
| 2,636,977 | A | 4/1953 | Foster |
| 3,337,035 | A | 8/1967 | Pennybacker |
| 3,511,559 | A | 5/1970 | Foster |
| 3,757,290 | A | 9/1973 | Ross et al. |
| 4,023,043 | A | 5/1977 | Stevenson |
| 4,114,186 | A | 9/1978 | Dominguez |

(Continued)

FOREIGN PATENT DOCUMENTS

WO WO 2004/023849 A1 3/2004

OTHER PUBLICATIONS

U.S. Appl. No. 13/275,536, filed Oct. 18, 2011, Verfuerth et al.
U.S. Appl. No. 61/466,411, filed Mar. 22, 2011, Verfuerth et al.

(Continued)

*Primary Examiner* — Minh D A

(74) *Attorney, Agent, or Firm* — Foley & Lardner LLP

(57) ABSTRACT

A system for mounting an outdoor fluorescent lamp lighting fixture to a pole includes a compression sleeve configured to receive and tighten around the pole, a pivot base fixed to the compression sleeve, a mount configured for securing to the fluorescent lamp lighting fixture and for pivotally coupling to the pivot base, where the mount includes multiple adjustment points configured to allow the mount to be fixed at varying angles relative to the pivot base.

17 Claims, 30 Drawing Sheets

(56) References Cited

U.S. PATENT DOCUMENTS 4,135,181 A 1/1979 Bognacki et al.
4,144,462 A 3/1979 Sieron et al.
4,190,800 A 2/1980 Kelly, Jr. et al.
4,204,194 A 5/1980 Bogacki
4,204,195 A 5/1980 Bogacki
4,306,769 A 12/1981 Martinet
4,360,881 A 11/1982 Martinson
4,387,417 A 6/1983 Plemmons et al.
4,489,386 A 12/1984 Breddan
4,727,593 A 2/1988 Goldstein
4,733,505 A 3/1988 Van Dame
4,809,468 A 3/1989 Bareiss
4,883,340 A 11/1989 Dominguez
4,998,095 A 3/1991 Shields
5,099,622 A 3/1992 Sutton
5,165,465 A * 11/1992 Kenet .......................... 165/11.1
5,371,661 A 12/1994 Simpson
5,426,620 A 6/1995 Budney
5,546,712 A 8/1996 Bixby
5,572,438 A 11/1996 Ehlers et al.
5,598,042 A 1/1997 Mix et al.
5,644,173 A 7/1997 Elliason et al.
5,655,339 A 8/1997 DeBlock et al.
5,717,609 A 2/1998 Packa et al.
5,729,387 A 3/1998 Takahashi et al.
5,758,331 A 5/1998 Johnson
5,956,462 A 9/1999 Langford
5,962,989 A 10/1999 Baker
6,122,603 A 9/2000 Budike, Jr.
6,169,979 B1 1/2001 Johnson
6,257,735 B1 7/2001 Baar
D447,266 S 8/2001 Verfuerth
6,363,667 B2 4/2002 O'Neill
D463,059 S 9/2002 Verfuerth
6,467,933 B2 10/2002 Baar
6,528,957 B1 3/2003 Luchaco
6,535,859 B1 3/2003 Yablonowski et al.
6,585,396 B1 7/2003 Verfuerth
D479,826 S 9/2003 Verfuerth et al.
6,622,097 B2 9/2003 Hunter
6,633,823 B2 10/2003 Bartone et al.
6,644,836 B1 11/2003 Adams
D483,332 S 12/2003 Verfuerth
6,671,586 B2 12/2003 Davis et al.
6,710,588 B1 3/2004 Verfuerth et al.
6,717,660 B1 4/2004 Bernardo
6,724,180 B1 4/2004 Verfuerth et al.
6,731,080 B2 5/2004 Flory
6,746,274 B1 6/2004 Verfuerth
6,758,580 B1 7/2004 Verfuerth
D494,700 S 8/2004 Hartman et al.
6,774,619 B1 8/2004 Verfuerth et al.
6,785,592 B1 8/2004 Smith et al.
6,828,695 B1 12/2004 Hansen
6,832,135 B2 12/2004 Ying
6,894,609 B2 5/2005 Menard et al.
6,938,210 B1 8/2005 Huh
6,964,502 B1 11/2005 Verfuerth
6,979,097 B2 12/2005 Elam et al.
6,983,210 B2 1/2006 Matsubayashi et al.
6,990,394 B2 1/2006 Pasternak
7,027,736 B1 4/2006 Mier-Langner et al.
7,130,719 B2 10/2006 Ehlers et al.
7,130,832 B2 10/2006 Bannai et al.
7,167,777 B2 1/2007 Budike, Jr.
D538,462 S 3/2007 Verfuerth et al.
7,264,177 B2 9/2007 Buck et al.
D557,817 S 12/2007 Verfuerth et al.
7,307,542 B1 12/2007 Chandler et al.
D560,469 S 1/2008 Bartol et al.
7,369,056 B2 5/2008 McCollough, Jr.
7,401,942 B1 7/2008 Verfuerth et al.
7,446,671 B2 * 11/2008 Giannopoulos et al. ... 340/12.24
7,518,531 B2 4/2009 Butzer et al.
D595,894 S 7/2009 Verfuerth et al.
7,563,006 B1 7/2009 Verfuerth et al.
7,575,338 B1 8/2009 Verfuerth
D606,697 S 12/2009 Verfuerth et al.
D606,698 S 12/2009 Verfuerth et al.
7,628,506 B2 12/2009 Verfuerth et al.
7,638,743 B2 12/2009 Bartol et al.
7,660,652 B2 2/2010 Smith et al.
D617,028 S 6/2010 Verfuerth et al.
D617,029 S 6/2010 Verfuerth et al.
7,738,999 B2 6/2010 Petite
7,762,861 B2 7/2010 Verfuerth et al.
D621,410 S 8/2010 Verfuerth et al.
D621,411 S 8/2010 Verfuerth et al.
7,784,966 B2 8/2010 Verfuerth et al.
D623,340 S 9/2010 Verfuerth et al.
7,812,543 B2 10/2010 Budike, Jr.
7,847,706 B1 12/2010 Ross et al.
7,859,398 B2 12/2010 Davidson et al.
D632,006 S 2/2011 Verfuerth et al.
8,033,686 B2 10/2011 Recker et al.
D650,225 S 12/2011 Bartol et al.
8,070,312 B2 12/2011 Verfuerth et al.
8,138,690 B2 3/2012 Chemel et al.
8,255,090 B2 8/2012 Frader-Thompson et al.
8,450,670 B2 5/2013 Verfuerth et al.
2001/0055965 A1 12/2001 Delp et al.
2002/0065583 A1 5/2002 Okada et al.
2002/0082748 A1 6/2002 Enga et al.
2002/0103655 A1 8/2002 Boies et al.
2002/0162032 A1 10/2002 Gundersen et al.
2002/0172049 A1 11/2002 Yueh
2002/0173321 A1* 11/2002 Marsden et al. .............. 455/500
2003/0011486 A1 1/2003 Ying
2003/0016143 A1 1/2003 Ghazarian
2003/0036820 A1 2/2003 Yellepeddy et al.
2003/0041017 A1 2/2003 Spool et al.
2003/0041038 A1 2/2003 Spool et al.
2003/0046252 A1 3/2003 Spool et al.
2003/0084358 A1 5/2003 Bresniker et al.
2003/0084359 A1 5/2003 Bresniker et al.
2003/0093332 A1 5/2003 Spool et al.
2003/0171851 A1 9/2003 Brickfield et al.
2003/0179577 A1 9/2003 Marsh
2004/0006439 A1 1/2004 Hunter
2004/0024483 A1 2/2004 Holcombe
2004/0076001 A1 4/2004 Lutes
2004/0078153 A1 4/2004 Bartone et al.
2004/0078154 A1 4/2004 Hunter
2004/0083163 A1 4/2004 Cooper
2004/0095237 A1 5/2004 Chen et al.
2004/0128266 A1 7/2004 Yellepeddy et al.
2004/0193329 A1 9/2004 Ransom et al.
2004/0201448 A1* 10/2004 Wang .......................... 340/3.43
2005/0027636 A1 2/2005 Gilbert et al.
2005/0034023 A1 2/2005 Maturana et al.
2005/0035717 A1 2/2005 Adamson et al.
2005/0038571 A1 2/2005 Brickfield et al.
2005/0043860 A1 2/2005 Petite
2005/0124346 A1 6/2005 Corbett et al.
2005/0232289 A1 10/2005 Walko et al.
2006/0002110 A1* 1/2006 Dowling et al. .............. 362/252
2006/0044152 A1* 3/2006 Wang ........................... 340/825
2006/0065750 A1 3/2006 Fairless
2006/0085301 A1 4/2006 Leahy
2006/0125426 A1 6/2006 Veskovic et al.
2006/0253885 A1 11/2006 Murphy et al.
2007/0043478 A1 2/2007 Ehlers et al.
2007/0085701 A1 4/2007 Walters et al.
2007/0097993 A1 5/2007 Bojahra et al.
2007/0145915 A1 6/2007 Roberge et al.
2007/0222581 A1 9/2007 Hawkins et al.
2007/0252528 A1 11/2007 Vermuelen et al.
2008/0007943 A1 1/2008 Verfuerth et al.
2008/0143273 A1 6/2008 Davidson et al.
2008/0147465 A1 6/2008 Raines et al.
2008/0183337 A1 7/2008 Szabados
2008/0218317 A1 9/2008 Choi
2008/0266664 A1 10/2008 Winston et al.
2008/0275802 A1 11/2008 Verfuerth et al.

(56) References Cited

U.S. PATENT DOCUMENTS

| | | | | |
|---|---|---|---|---|
| 2008/0291054 | A1* | 11/2008 | Groft | 340/932.2 |
| 2009/0000217 | A1 | 1/2009 | Verfuerth et al. | |
| 2009/0009989 | A1 | 1/2009 | Verfuerth et al. | |
| 2009/0014625 | A1 | 1/2009 | Bartol et al. | |
| 2009/0147507 | A1 | 6/2009 | Verfuerth et al. | |
| 2009/0150004 | A1* | 6/2009 | Wang et al. | 700/286 |
| 2009/0189535 | A1 | 7/2009 | Verfuerth et al. | |
| 2009/0209162 | A1 | 8/2009 | Bartol | |
| 2009/0222142 | A1 | 9/2009 | Kao et al. | |
| 2009/0243517 | A1 | 10/2009 | Verfuerth et al. | |
| 2009/0248217 | A1 | 10/2009 | Verfuerth et al. | |
| 2009/0251066 | A1 | 10/2009 | Baaijens et al. | |
| 2009/0299811 | A1 | 12/2009 | Verfuerth et al. | |
| 2009/0303722 | A1 | 12/2009 | Verfuerth et al. | |
| 2009/0315485 | A1 | 12/2009 | Verfuerth et al. | |
| 2010/0061088 | A1 | 3/2010 | Bartol et al. | |
| 2010/0246168 | A1 | 9/2010 | Verfuerth et al. | |
| 2011/0060701 | A1* | 3/2011 | Verfuerth et al. | 705/500 |
| 2011/0146669 | A1 | 6/2011 | Bartol et al. | |
| 2011/0235317 | A1 | 9/2011 | Verfuerth et al. | |
| 2011/0279063 | A1 | 11/2011 | Wang et al. | |
| 2012/0037725 | A1 | 2/2012 | Verfuerth | |
| 2012/0038281 | A1 | 2/2012 | Verfuerth | |
| 2012/0038490 | A1 | 2/2012 | Verfuerth | |
| 2012/0040606 | A1 | 2/2012 | Verfuerth | |
| 2012/0044350 | A1 | 2/2012 | Verfuerth | |
| 2012/0081906 | A1 | 4/2012 | Verfuerth et al. | |
| 2012/0167957 | A1 | 7/2012 | Verfuerth et al. | |
| 2012/0274222 | A1 | 11/2012 | Verfuerth et al. | |
| 2013/0006437 | A1 | 1/2013 | Verfuerth et al. | |
| 2013/0033183 | A1 | 2/2013 | Verfuerth et al. | |

OTHER PUBLICATIONS

"About Sun Dome Tubular Skylights," having a date indication of © 2009, 8 pages.

Deru et al.; BigHorn Home Improvement Center Energy Performance; ASHRAE Transactions, Atlanta: 2006 vol. 112, 26 pages.

Galasiu et al. "Energy saving lighting control systems for open-plan offices: a filed study"; Jul. 2007, National Research Council Canada; vol. 4; No. 1, pp. 1-28, 56 pages.

Halliday, D., et al., Physics Part I and II; John Wiley& Sons, Inc. 1967 (9 pgs.).

Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.

Notice of Acceptance (NOA) from Miami-Dade County, Building Code Compliance Office, Product Control Division, Approval Date Dec. 13, 2007, 2 pages.

Sun-Dome /Tubular Skylight, Daylighting Technologies, Riviera Beach, FL, revision Oct. 22, 2007, 1 page.

U.S. Appl. No. 11/744,083, filed May 3, 2007, Verfuerth et al.
U.S. Appl. No. 11/771,331, filed Jun. 29, 2007, Verfuerth et al.
U.S. Appl. No. 12/011,771, filed Jan. 29, 2008, Verfuerth et al.
U.S. Appl. No. 12/070,651, filed Feb. 20, 2008, Bartol.
U.S. Appl. No. 12/057,217, filed Mar. 27, 2008, Verfuerth et al.
U.S. Appl. No. 12/172,888, filed Jul. 14, 2008, Verfuerth et al.
U.S. Appl. No. 12/203,825, filed Sep. 3, 2008, Verfuerth et al.
U.S. Appl. No. 12/240,805, filed Sep. 29, 2008, Verfuerth et al.
U.S. Appl. No. 12/345,443, filed Dec. 29, 2008, Verfuerth et al.
U.S. Appl. No. 29/333,666, filed Mar. 12, 2009, Verfuerth et al.
U.S. Appl. No. 61/165,397, filed Mar. 31, 2009, Verfuerth et al.
U.S. Appl. No. 12/484,043, filed Jun. 12, 2009, Verfuerth et al.
U.S. Appl. No. 29/342,678, filed Aug. 25, 2009, Verfuerth et al.
U.S. Appl. No. 12/550,270, filed Aug. 28, 2009, Verfuerth et al.
U.S. Appl. No. 29/342,679, filed Aug. 28, 2009, Verfuerth et al.
U.S. Appl. No. 61/275,985, filed Sep. 4, 2009, Verfuerth et al.
U.S. Appl. No. 29/343,009, filed Sep. 4, 2009, Verfuerth et al.
U.S. Appl. No. 29/343,007, filed Sep. 4, 2009, Verfuerth et al.
U.S. Appl. No. 12/559,240, filed Sep. 14, 2009, Bartol et al.
U.S. Appl. No. 29/343,499, filed Sep. 14, 2009, Bartol et al.
U.S. Appl. No. 12/646,739, filed Dec. 23, 2009, Bartol et al.

* cited by examiner 200
202
204
206
208
209
210
211
212
213
214
214
214
215
218
220
222
230

OUTDOOR FLUORESCENT LIGHTING FIXTURES AND RELATED SYSTEMS AND METHODS

CROSS-REFERENCE TO RELATED APPLICATIONS

This patent application claims the benefit of priority under 35 U.S.C. §119(e) of U.S. Provisional Application No. 61/275,985, having a filing date of Sep. 4, 2009, titled “Outdoor Fluorescent Lighting Fixtures and Related Systems and Methods,” the complete disclosure of which is hereby incorporated by reference.

BACKGROUND

The present invention relates generally to the field of outdoor lights such as street lights or parking lot lights. Street lights or parking lot lights conventionally utilize high intensity discharge lamps. More recently, LEDs have been used for such applications.

SUMMARY

According to one aspect, a system for mounting a fluorescent lamp lighting fixture to a pole includes a compression sleeve configured to receive and tighten around the pole, a pivot base fixed to the compression sleeve, a mount configured for securing to the fluorescent lamp lighting fixture and for pivotally coupling to the pivot base, where the mount includes a plurality of adjustment points configured to allow the mount to be fixed at varying angles relative to the pivot base.

According to another aspect, a mounting system for mounting an elongated fluorescent lamp lighting fixture to a pole includes a mount configured to receive a pole and to couple to a saddle clamp configured to tighten around the pole, the mount configured to be secured to the fluorescent lamp lighting fixture and where the mount extends cross-wise to the length of the fluorescent lamp lighting fixture.

According to yet another aspect, an outdoor lighting fixture includes a housing, a mounting assembly coupled to the housing and configured for coupling to a pole for holding the outdoor lighting fixture above the ground, a first ballast and a second ballast within the housing and configured to provide controlled current to a first lamp and a second lamp set, a circuit configured to cause the first lamp set to illuminate by default and to determine when the first lamp set has reached an end of life, where the circuit is further configured to cause the second lamp set to illuminate rather than the first lamp set based on the determination that the first lamp set has reached the end of life.

According to a further aspect, an outdoor lighting fixture for a fluorescent lamp includes a mounting system configured for coupling to existing outdoor lamp poles, a housing coupled to the mounting system and configured to at least partially surround the fluorescent lamp, a wireless transceiver coupled to at least one of the mounting system and the housing, and a processing circuit coupled to the wireless transceiver, where the processing circuit is configured to compile a log of events for the fluorescent lamp, wherein the processing circuit is configured to transmit data based on information from the log to at least one remote source via radio frequency communications.

According to another aspect, a method of replacing outdoor lighting fixtures includes the steps of identifying a municipality having a plurality of existing outdoor lighting fixtures, estimating a number of the existing outdoor lighting fixtures, estimating a cost of operating the existing outdoor lighting fixtures over a time period using actual or projected electricity rates, determining a projected cost savings attainable over the time period by replacing the existing outdoor lighting fixtures with new fluorescent outdoor lighting fixtures, generating at least one of a report or a graphical user interface displaying at least the projected cost savings, and delivering new fluorescent outdoor lighting fixtures to the municipality.

According to yet another aspect, a system for illuminating a display includes an outdoor fluorescent lamp lighting fixture. An adaptor is coupled to the display, and a compression sleeve or a saddle clamp is securely engaged to the adaptor. A pivot base is coupled to the compression sleeve or the saddle clamp, and a mount is coupled to the fluorescent lamp lighting fixture and pivotally coupled to the pivot base, so that the outdoor fluorescent lamp lighting fixture is adjustably positionable in any one or more of a plurality of positions to illuminate the display.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
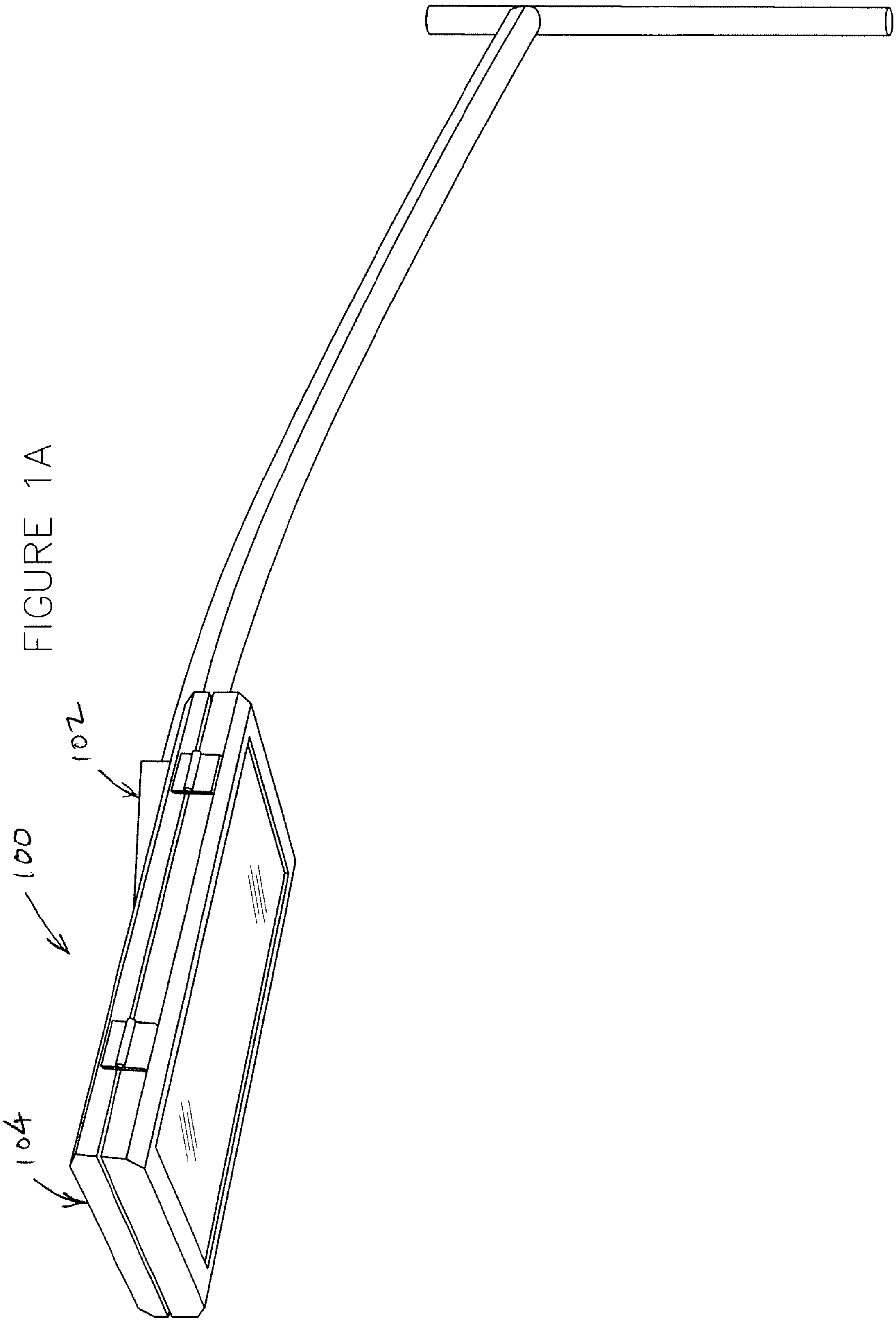
FIG. 1A is a schematic image of a perspective view of an outdoor fluorescent lighting fixture coupled to a pole and directed toward the ground.
Figure 1B:
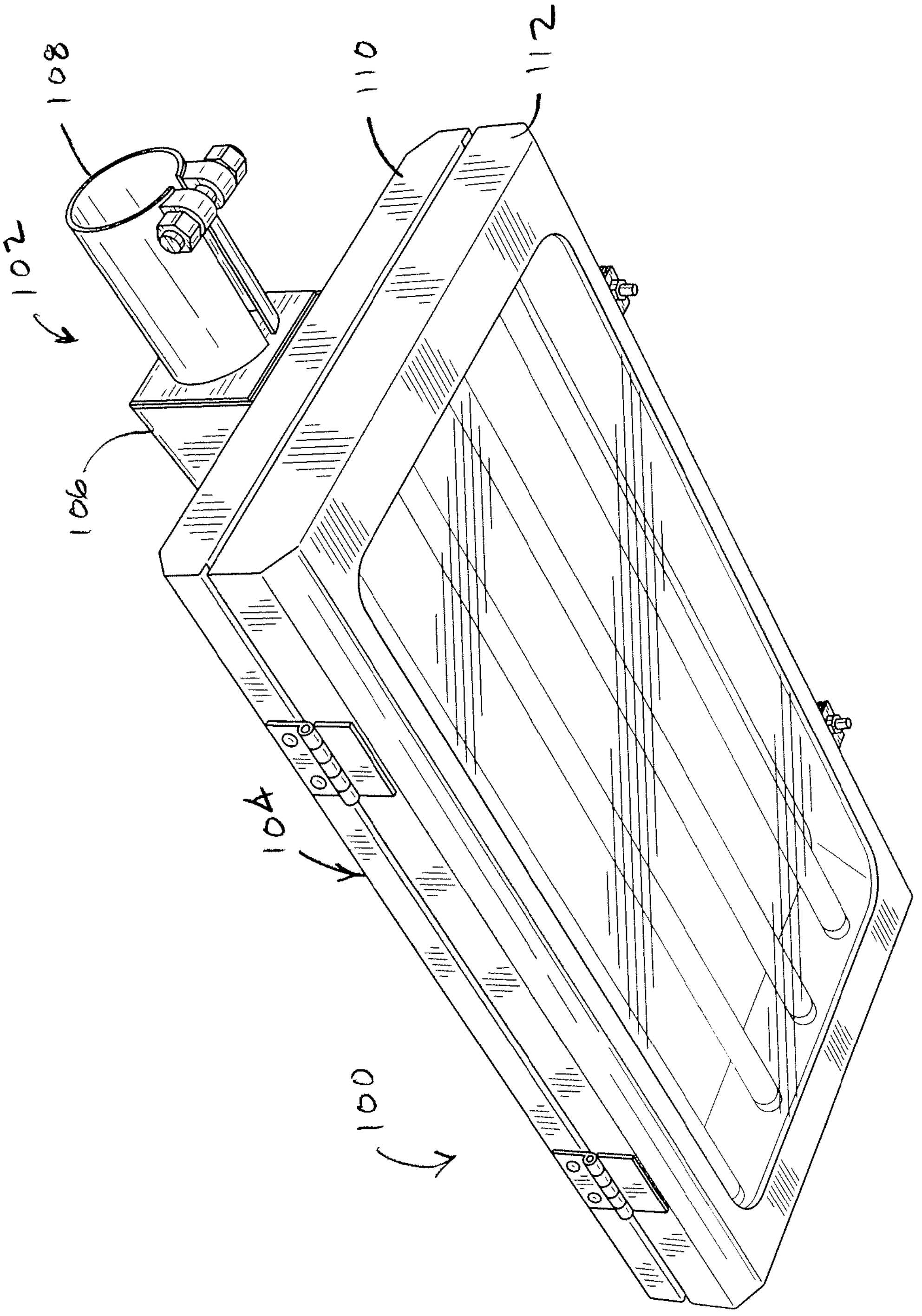
FIG. 1B is a schematic image of a bottom perspective view of the fixture shown in FIG. 1A.
Figure 1C:
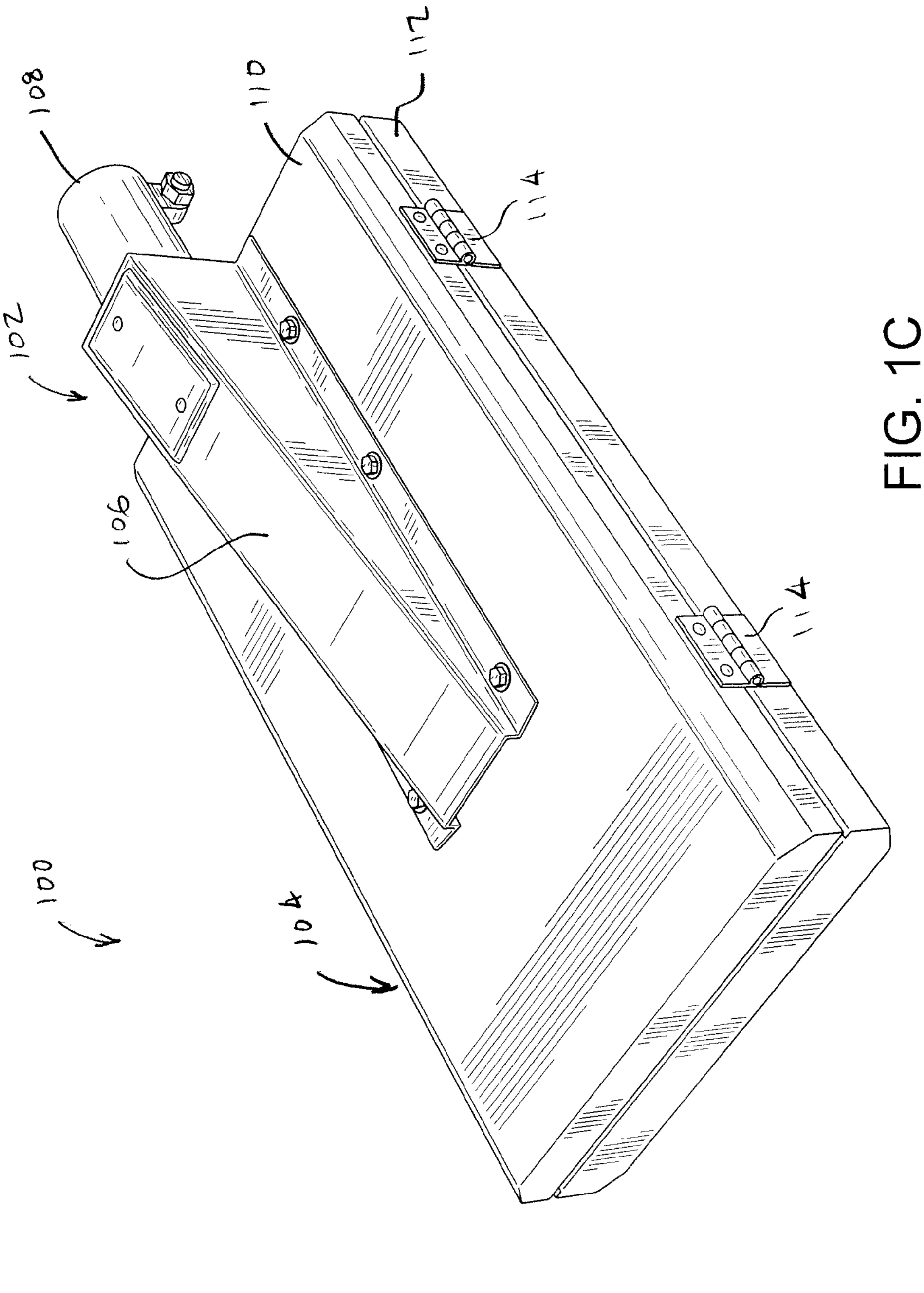
FIG. 1C is a schematic image of a top perspective view of the fixture shown in FIG. 1A.
Figure 1D:
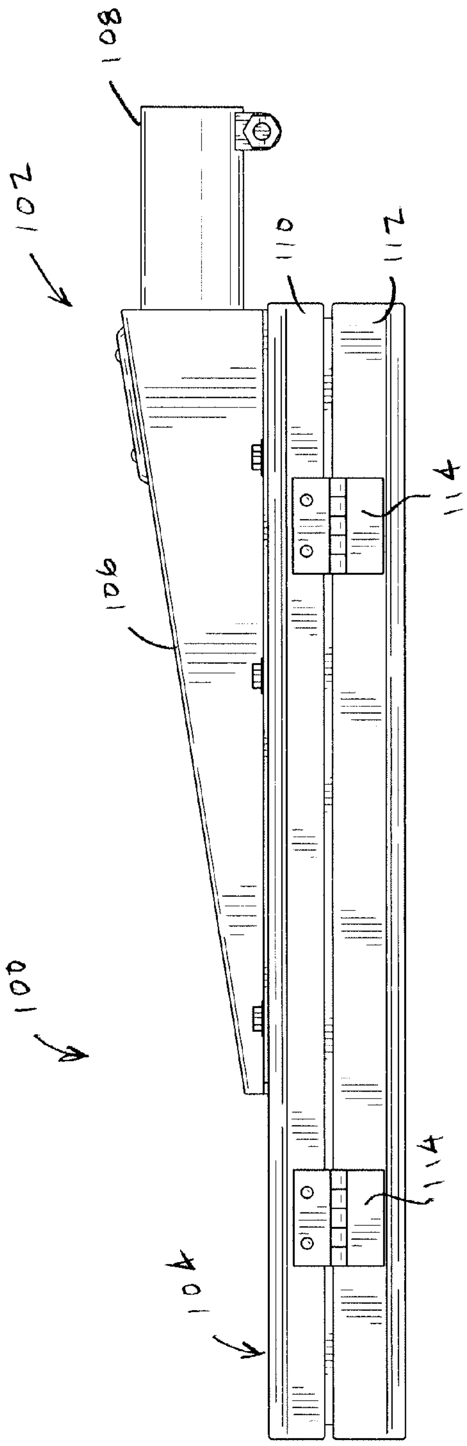
FIG. 1D is a schematic image of a first side view of the fixture shown in FIGS. 1A-1C.
Figure 1E:
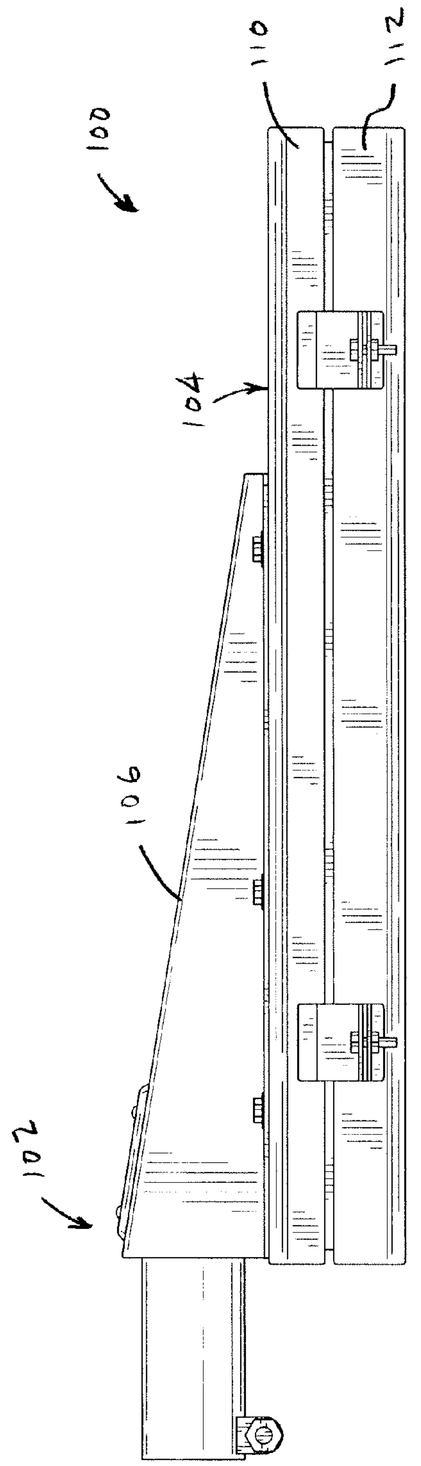
FIG. 1E is a schematic image of a second side view of the fixture shown in FIGS. 1A-1D.
Figure 1F:
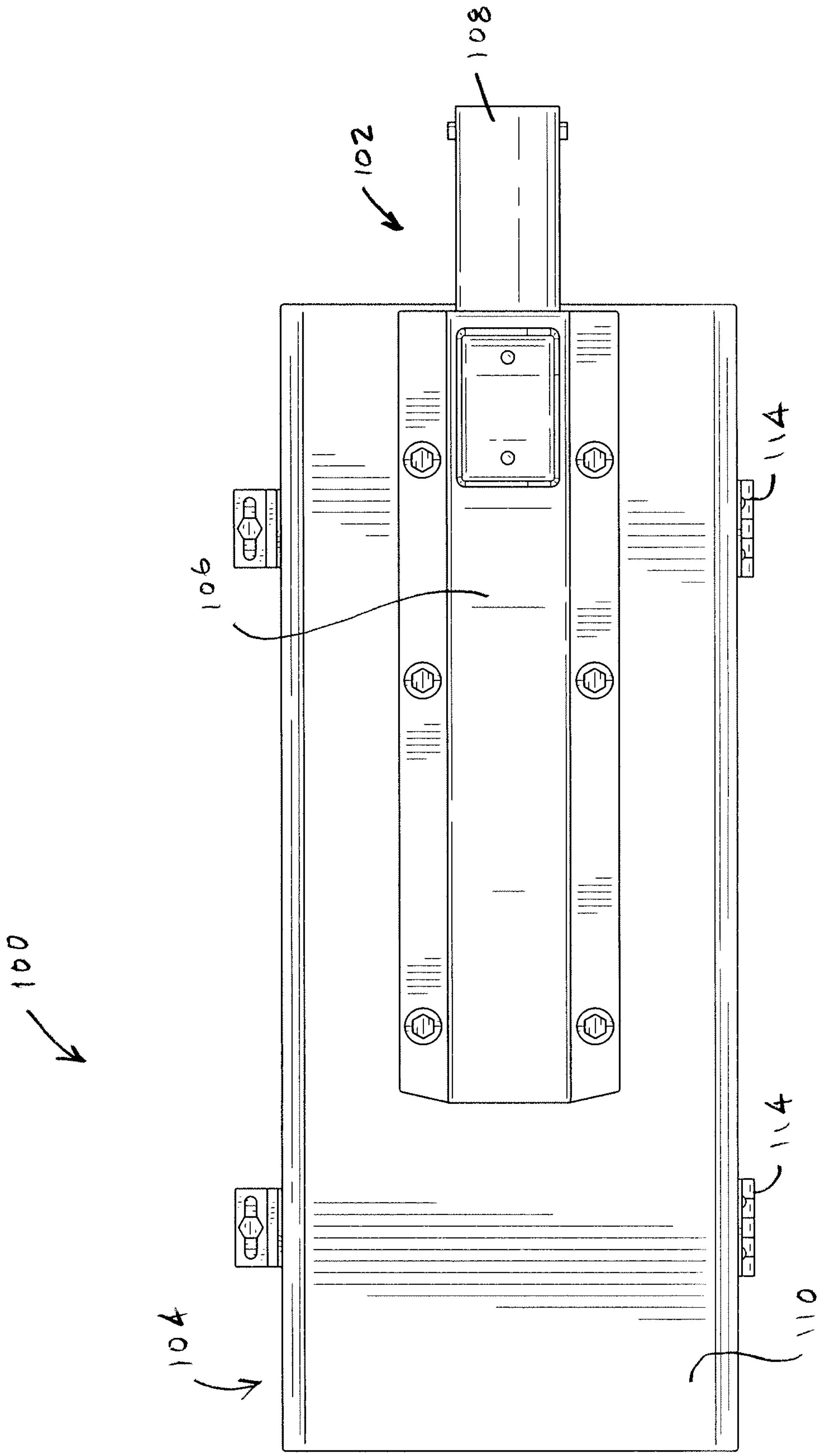
FIG. 1F is a schematic image of a top view of the fixture shown in FIGS. 1A-1E.
Figure 1G:
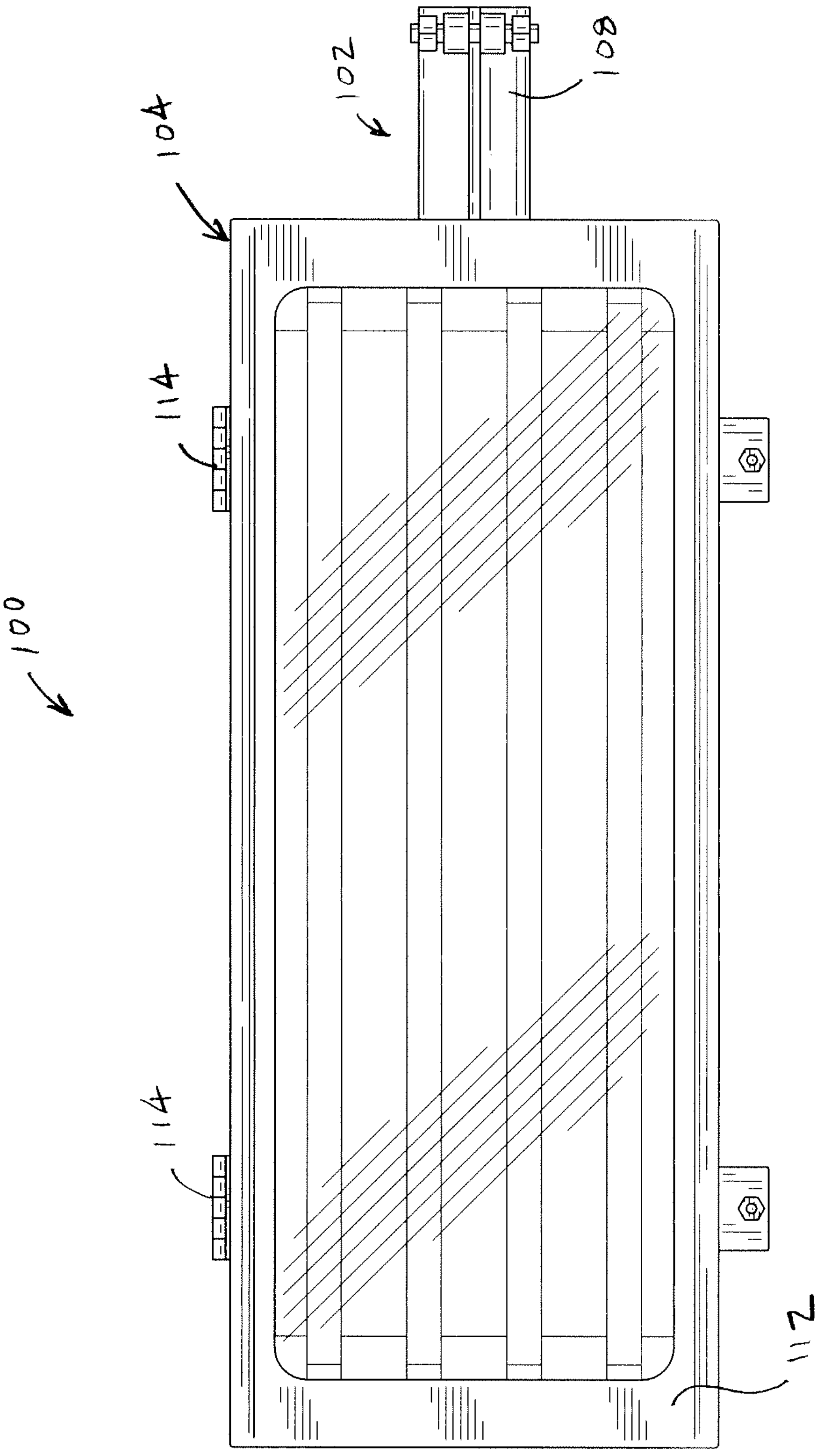
FIG. 1G is a schematic image of a bottom view of the fixture shown in FIGS. 1A-1F.
Figure 1H:
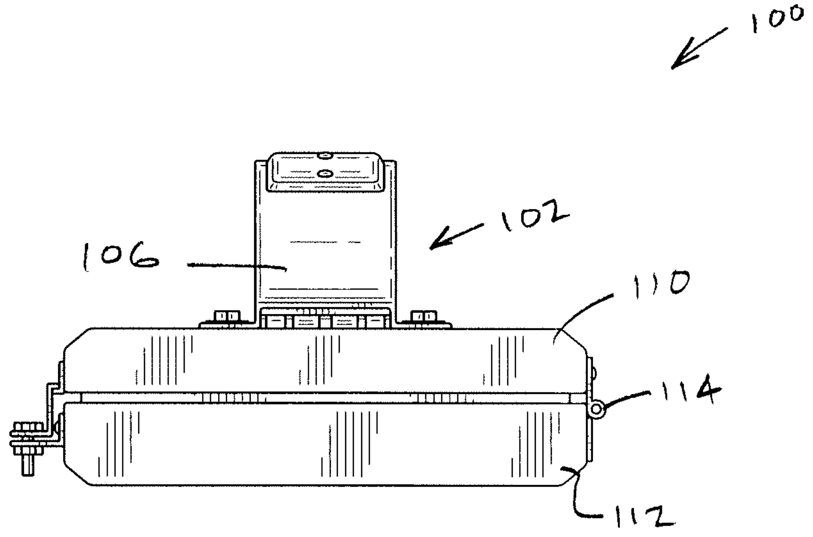
FIG. 1H is a schematic image of a front view of the fixture shown in FIGS. 1A-1G.
Figure 1I:
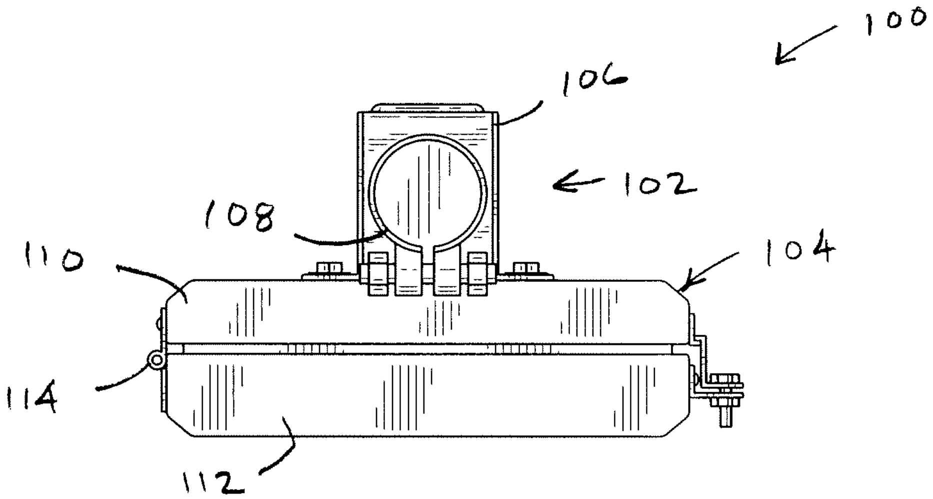
FIG. 1I is a schematic image of a rear view of the fixture shown in FIGS. 1A-1H.

Referring generally to the FIGURES, outdoor fluorescent lighting fixtures and related systems and methods are shown. The outdoor fluorescent lighting fixture is configured for applications such as a street lighting application, parking lot lighting, display (e.g. building-elevation, billboard, etc.) application, etc. In some embodiments, the outdoor fluorescent lighting fixture is usually configured to include a mounting system for coupling the fluorescent lighting fixture to high poles or masts. In some embodiments, the outdoor fluorescent fixture may be configured for mounting directly to a wall. The outdoor fluorescent lighting fixture may also be configured to provide wired or wireless communications capabilities, one or more control algorithms based on sensor feedback, built-in redundancy, and venting. Systems and methods for replacement of conventional outdoor lights with outdoor fluorescent lighting fixtures of the present application are also shown and described.

Many of the outdoor lighting fixtures described herein advantageously mount to existing street light poles or other outdoor structures (e.g. as a retrofit installation) for holding lighting fixtures such that no modification to the existing infrastructure (other than replacing the lighting fixture itself) is necessary. In some embodiments the lighting fixtures include wireless communications interfaces so that advanced and/or energy saving control features may be provided to a group of lighting fixtures or a municipality without changing existing wiring running from pole to pole.

Referring more particularly to FIGS. 1A-1I, a lighting fixture 100 is shown to include a mounting system 102 and a housing 104. Mounting system 102 is generally configured to mount fixture 100 including housing 104 to a pole or mast. Housing 104 surrounds one or more fluorescent lamps (e.g., fluorescent tubes) and includes a lens (e.g., a plastic sheet, a glass sheet, etc.) that allows light from the one or more fluorescent lamps to be provided from housing 104.

Mounting system 102 is shown to include a mount 106 and a compression sleeve 108. Compression sleeve 108 is configured to receive the pole and to tighten around the pole (e.g., when a clamp is closed, when a bolt is tightened, etc.). Compression sleeve 108 may be sized and shaped for attachment to existing outdoor poles such as street light poles, sidewalk poles, parking lot poles, and the like. As is provided by mounting system 102, the coupling mechanism may be mechanically adaptable to different poles or masts. For example, compression sleeve 108 may include a taper or a tapered cut so that the compression sleeve need not match the exact diameter of the pole or mast to which it will be coupled. While the embodiments shown in the present application utilize a compression sleeve 108 for the mechanism for coupling the mounting system to a pole or mast, other coupling mechanisms may alternatively be used (e.g., a two-piece clamp, one or more arms that bolt to the pole, a saddle clamp arrangement such as that shown in FIG. 2I and described further herein, etc.).

According to an exemplary embodiment, fixture 100 and housing 104 are elongated and mount 106 extends along the length of housing 104. Mount 106 is preferably secured to housing 104 in at least one location beyond a lengthwise center point and at least one location before the lengthwise center point. As shown in FIGS. 1A-1I, the axis of compression sleeve 108 also extends along the length of housing 104. In the embodiments shown in FIGS. 1A-1I, compression sleeve 108 is coupled to one end of mount 106 near a lengthwise end of housing 104.

Housing 104 is shown to include a fixture pan 110 and a door frame 112 that mates with fixture pan 110. In the embodiments shown in the FIGURES, door frame 112 is mounted to fixture pan 110 via hinges 114 and latches 116. When latches 116 are released, door frame 112 swings away from fixture pan 110 to allow access to the fluorescent bulbs within housing 104. Latches 116 are shown as compression-type latches, although many alternative locking or latching mechanisms may be alternatively or additionally provided to secure the different sections of the housing. In some embodiments the latches may be similar to those found on "NEMA 4" type junction boxes or other closures. Further, while the hinges may be as shown in FIGS. 1A-1I, many different hinge mechanisms may be used. Yet further, in some embodiments door frame 112 and fixture pan 110 may not be joined by a hinge and may be secured together via latches 116 on all sides, any number of screws, bolts or other fasteners that do not allow hinging, or the like. In an exemplary embodiment, fixture pan 110 and door frame 112 are configured to sandwich a rubber gasket that provides some sealing of the interior of housing 104 from the outside environment. In some embodiments the entirety of the interior of the lighting fixture is sealed such that rain and other environmental moisture does not easily enter housing 104. According to one embodiment, the sealing interface may include a gasket disposed upon a ledge within the housing and configured to engage the cover, where the ledge may be formed by bending a portion of the housing sheet material during formation of the housing, or the ledge may be a separate member that is coupled (e.g. by welding, etc.) within the housing. Housing 104 and its component pieces may be galvanized steel but may be any other metal (e.g., aluminum), plastic, and/or composite material. Housing 104, mounting system 102 and/or the other metal structures of lighting fixture 100 may be powder coated or otherwise treated for durability of the metal. According to an exemplary embodiment housing 104 is powder coated on the interior and exterior surfaces to provide a hard, relatively abrasion resistant, and tough surface finish.

Housing 104, mounting system 102, compression sleeve 108, and the entirety of lighting fixture 100 are preferably extremely robust and able to withstand environmental abuses of outdoor lighting fixtures. The shape of housing 104 and mounting system 102 are preferably such that the effective projection area (EPA) relative to strong horizontal winds is minimized—which correspondingly provides for minimized wind loading parameters of the lighting fixture.

Ballasts, structures for holding lamps, and the lamps themselves may be installed to the interior of fixture pan 110. Further, a reflector may be installed between the lamp and the interior metal of fixture pan 110. The reflector may be of a defined geometry having a reflective surface, such as coated with a white reflective thermosetting powder coating applied to the light reflecting side of the body (i.e., a side of the reflector body that faces toward a fluorescent light bulb). The white reflective coating may have reflective properties, which in combination with the defined geometry of the reflector, provides high reflectivity. The reflective coating may be as described in U.S. patent application Ser. No. 12/748,323 titled “Reflector with Coating for a Fluorescent Light and filed Mar. 26, 2010. In other exemplary embodiments, different reflector geometries may be used and the reflector may be uncoated or coated with other coating materials. In yet other embodiments, the reflector may be a “MIRO 4” type reflector manufactured and sold by Alanod GmbH & Co KG.

The shape and orientation of housing 104 relative to the reflector and/or the lamps is configured to provide a full cut off such that light does not project above the plane of fixture pan 110. The lighting fixtures described herein are preferably “dark-sky” compliant or friendly.

As shown in the FIGURES, door frame 112 includes an opening that is fitted with a lens by lens retainers 118 and 120. End lens retainers 118 are disposed at the ends of housing 104 and lens retainer long sides 120 are disposed along the long sides of housing 104. A lens such as a glass pane may be sandwiched between the lens retainers 118, 120 and the periphery of door frame 112's opening. According to an exemplary embodiment, the lens is also sealed to door frame 112 by a gasket. The gasket may be made from hot melt silicone, weather-proof foam, rubber, or any other suitable material for forming a seal between a plane of glass and a metal frame. Lens retainers 118, 120 and door frame 112 may be sized to accept lenses of different types or thicknesses. The lenses may be diffuser type lenses, 3-dimensional diffusers, include vacuum formed ridges and lines, or are otherwise shaped or treated for enhanced (or restricted) light dispersion.

To provide further resistance to environmental variables such as moisture, housing 104 may include one or more vents configured to allow moisture and air to escape housing 104 while not allowing moisture to enter housing 104. Moisture may enter enclosed lighting fixtures due to vacuums that can form during hot/cold cycling of the lamps. According to an exemplary embodiment, the vents include, are covered by, or are in front of one or more pieces of material that provide oleophobic and hydrophobic protection from water, washing products, dirt, dust and other air contaminants. According to an exemplary embodiment the vents may include GORE membrane sold and manufactured by W.L. Gore & Associates, Inc. The vent may include a hole in the body of housing 104 that is plugged with a snap-fit (or otherwise fit) plug including an expanded polytetrafluoroethylene (ePTFE) membrane with a polyester non-woven backing material.

Figure 1J:
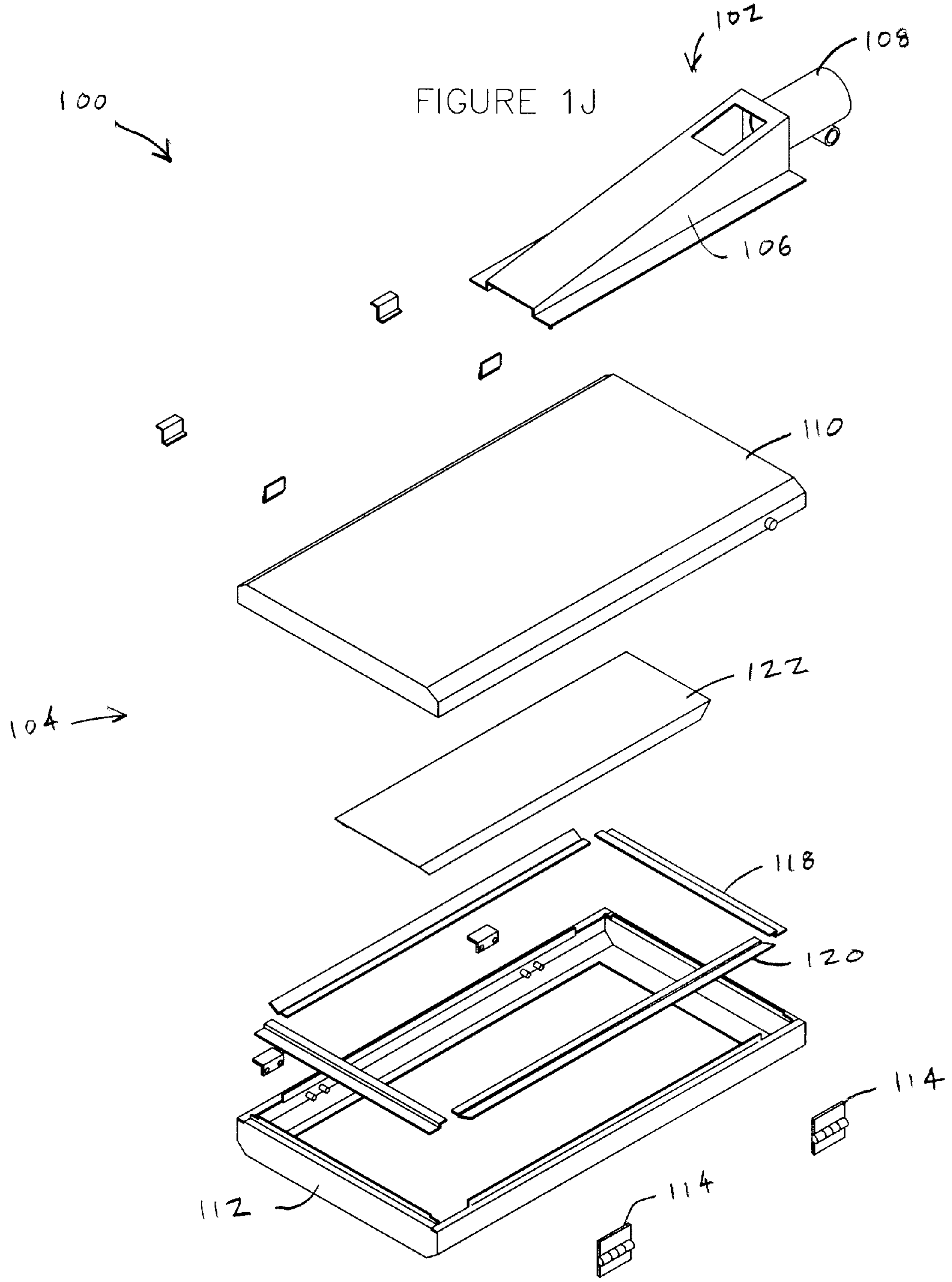
FIG. 1J is a schematic image of an exploded view of the outdoor fluorescent lighting fixture shown in FIGS. 1A-1I according to an exemplary embodiment.

Reinforcing channel 122 is provided to the interior of housing 104. In other embodiments, reinforcing channel 122 is provided to the exterior of housing 104. As shown, reinforcing channel 122 is an elongated piece of metal having fastener holes that match those of fixture pan 110. Accordingly, the fasteners that secure mounting system 102 to fixture pan 110 actually sandwich fixture pan 110 between a flange of mounting system 102 and reinforcing channel 122. Reinforcing channel 122 is further shown to include at least one fold or flange (shown in FIG. 1J as extending the length of reinforcing channel 122) that is not parallel with the top plane of fixture pan 110. In some embodiments, for example, one or more flanges of reinforcing channel 122 may be perpendicular to the top plane of fixture pan 110. Reinforcing channel 122 may be formed from steel, aluminum, plastic, or any other material that adds structural rigidity to the lighting fixture.

Referring more particularly to FIGS. 2A-2I, outdoor fluorescent lighting fixture 200 may include many of the same parts or similar parts as fixture 100 shown in FIGS. 1A-1I, but includes a different mounting system 202 and mounting orientation. Mounting system 202 is shown to include compression sleeve 208 that may be configured the same as, similar to, or different than compression sleeve 108 shown in FIGS. 1A-1I. Mounting system 202 further includes a mount 206. Rather than mount 206 extending down the length of housing 204 such as mount 106 shown in FIGS. 1A-1I, mount 206 extends across the width of an elongated housing 204. Compression sleeve 208 is shown as fixed to a pivot base 209. Mount 206 is configured for securing to housing 204 and for pivotally coupling to pivot base 209. Holes 211 and 213 in mount 206 and pivot base 209 are configured to receive the same pin or pins and mount 206 and pivot base 209 pivotably couple via the holes 211, 213 and the pin or pins.

The pivot formed between pivot base 209 and mount 206 allows housing 204 (and therefore the fluorescent lamps) to rotate or pivot relative to the pole received by compression sleeve 208. Such arrangement is intended to be suitable for use as a parking lot fixture (or the like), where lighting from the fixture is desired to project down and in an outward direction. According to an exemplary embodiment, mount 206 includes a plurality of adjustment points 215 configured to allow mount 206 to be fixed at discrete angles relative to pivot base 209. According to an exemplary embodiment, adjustment points 215 are a plurality of holes for receiving pins or bolts.

Figure 2A:
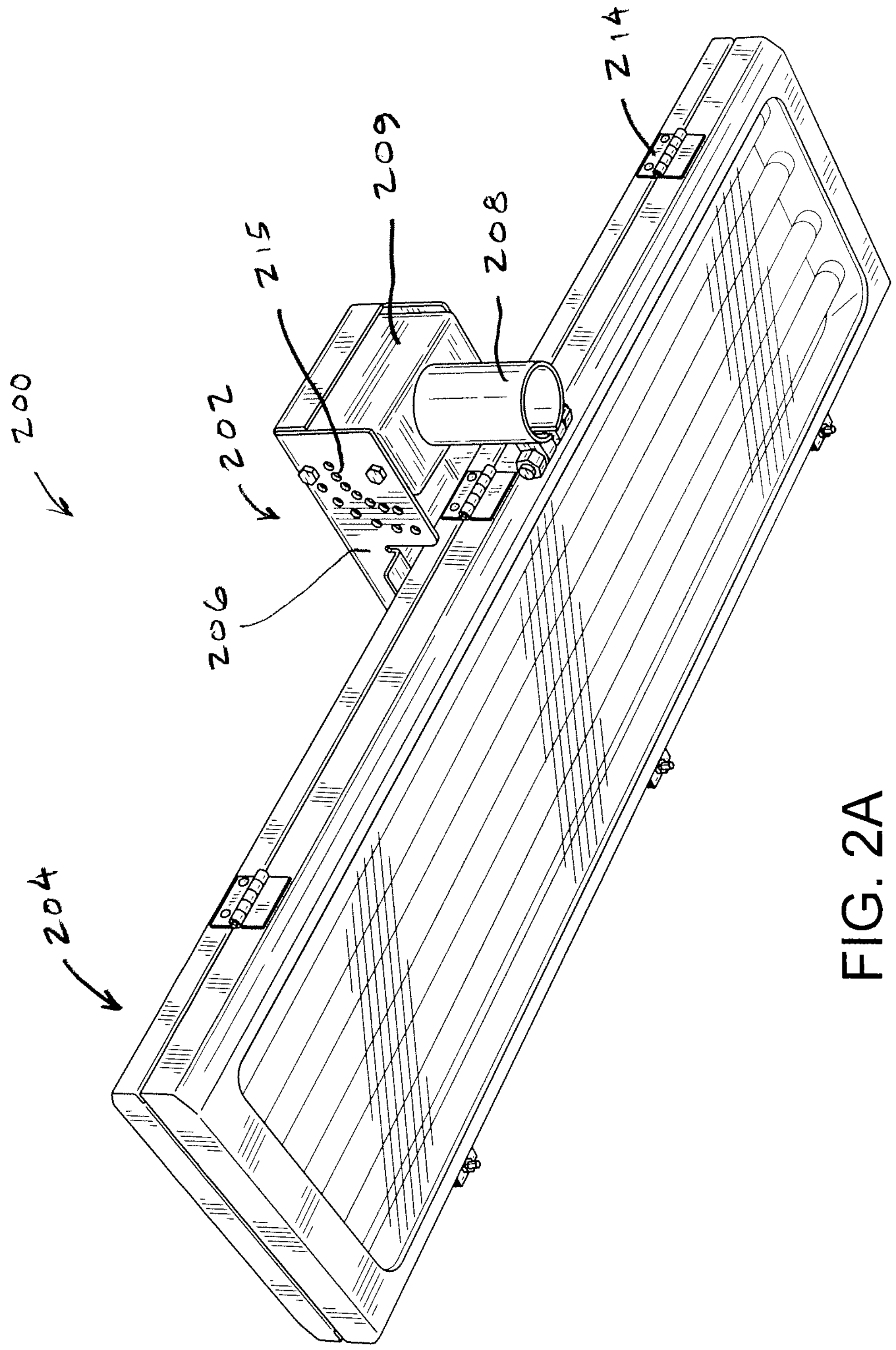
FIG. 2A is a schematic image of a bottom perspective view of another outdoor fluorescent lighting fixture that may be coupled to a pole and directed toward the ground.
Figure 2B:
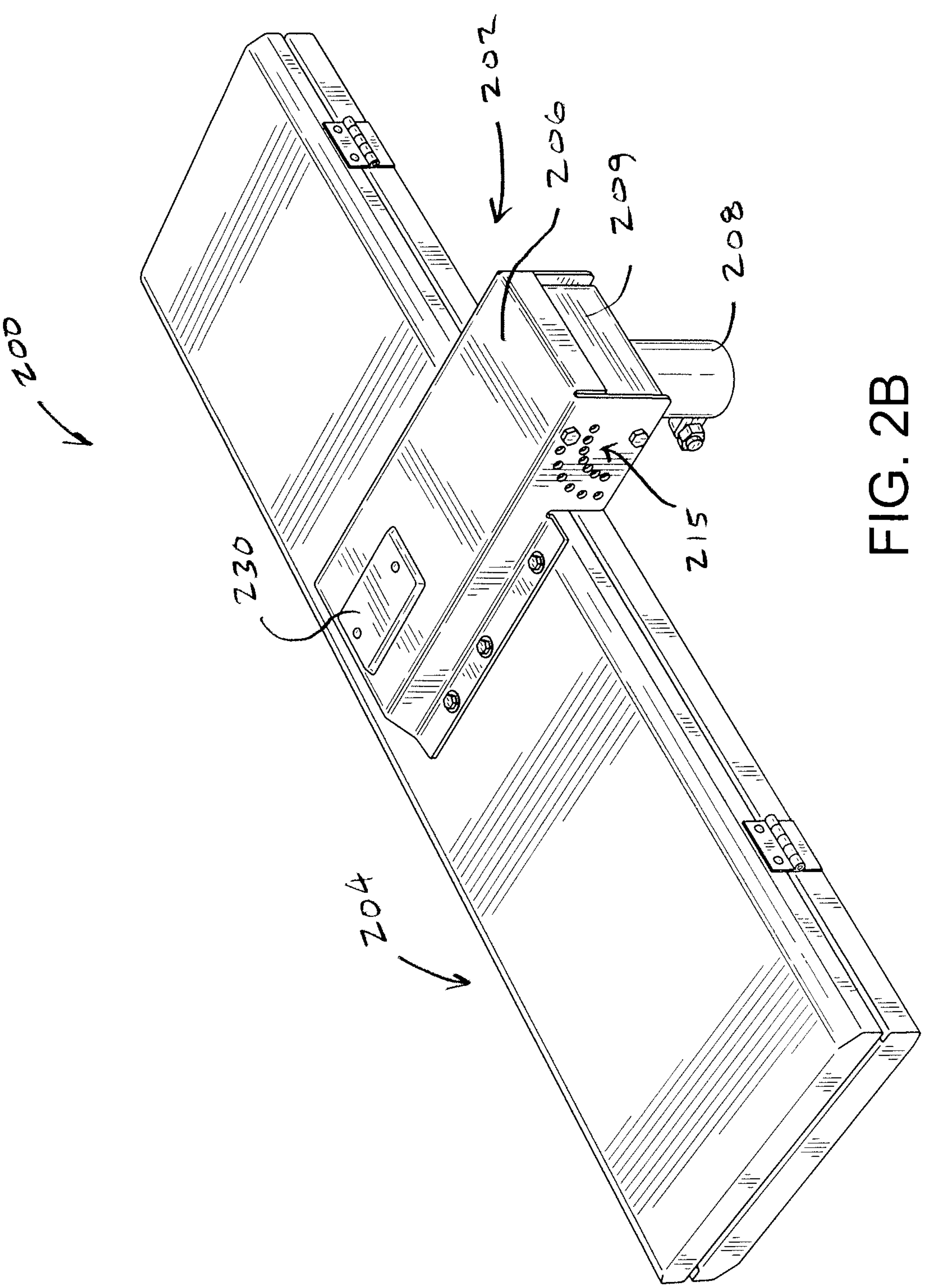
FIG. 2B is a schematic image of a top perspective view of the fixture shown in FIG. 2A.
Figure 2C:
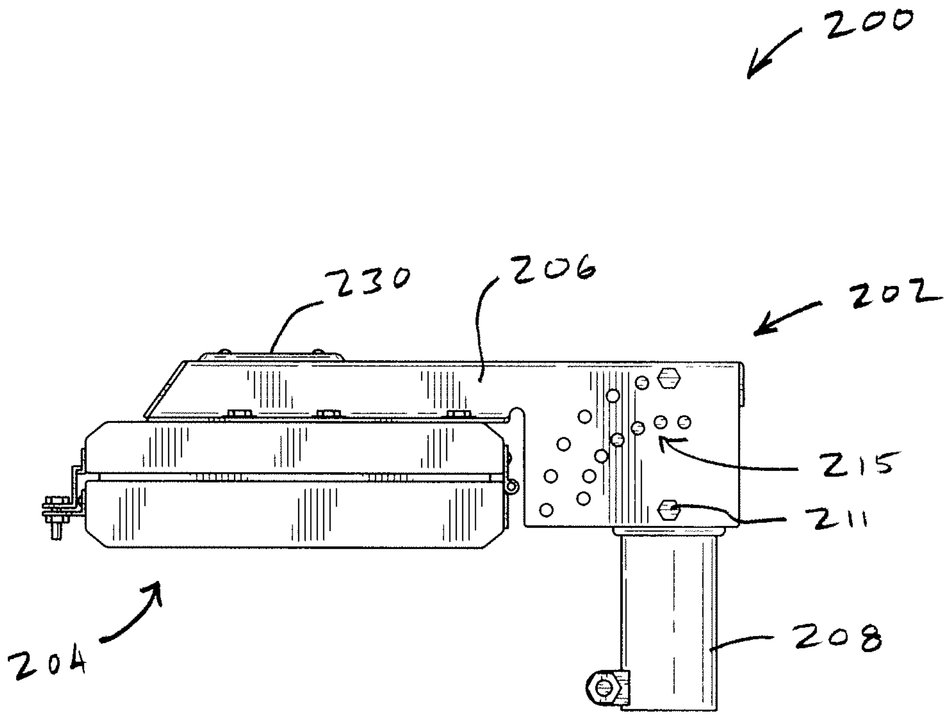
FIG. 2C is a schematic image of a side view of the fixture shown in FIGS. 2A-2B.
Figure 2D:
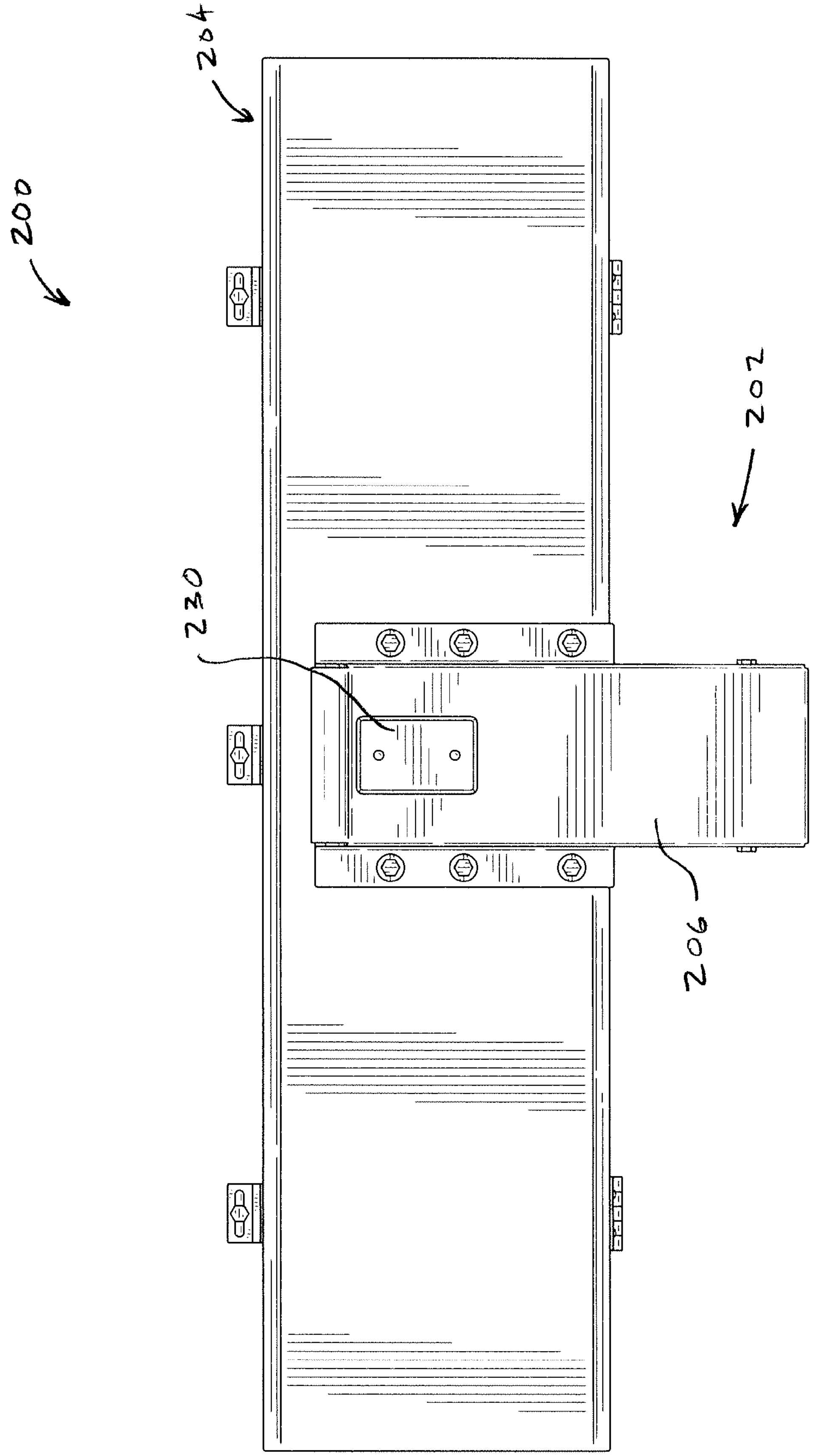
FIG. 2D is a schematic image of a top view of the fixture shown in FIGS. 2A-2C.
Figure 2E:
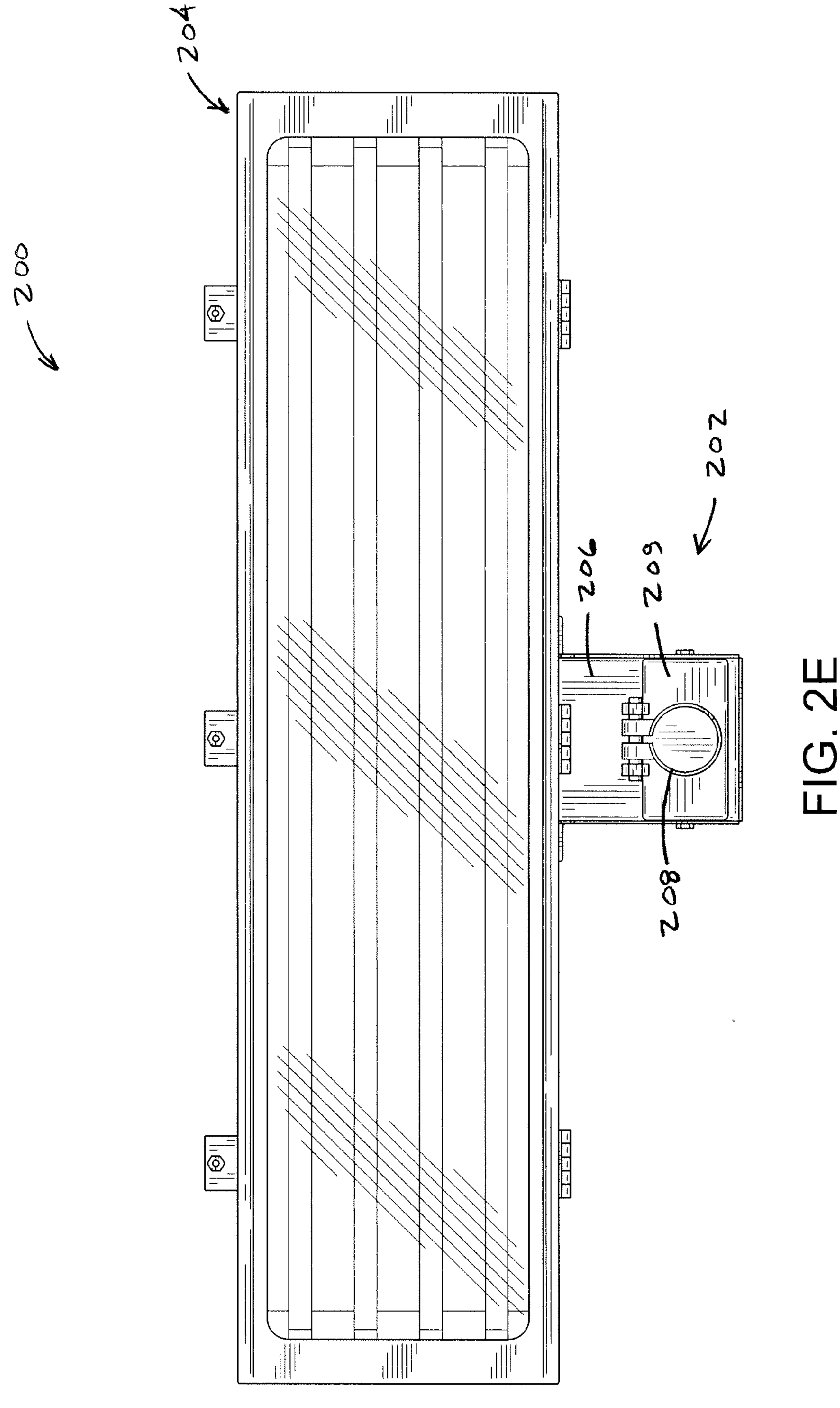
FIG. 2E is a schematic image of a bottom view of the fixture shown in FIGS. 2A-2D.
Figure 2F:
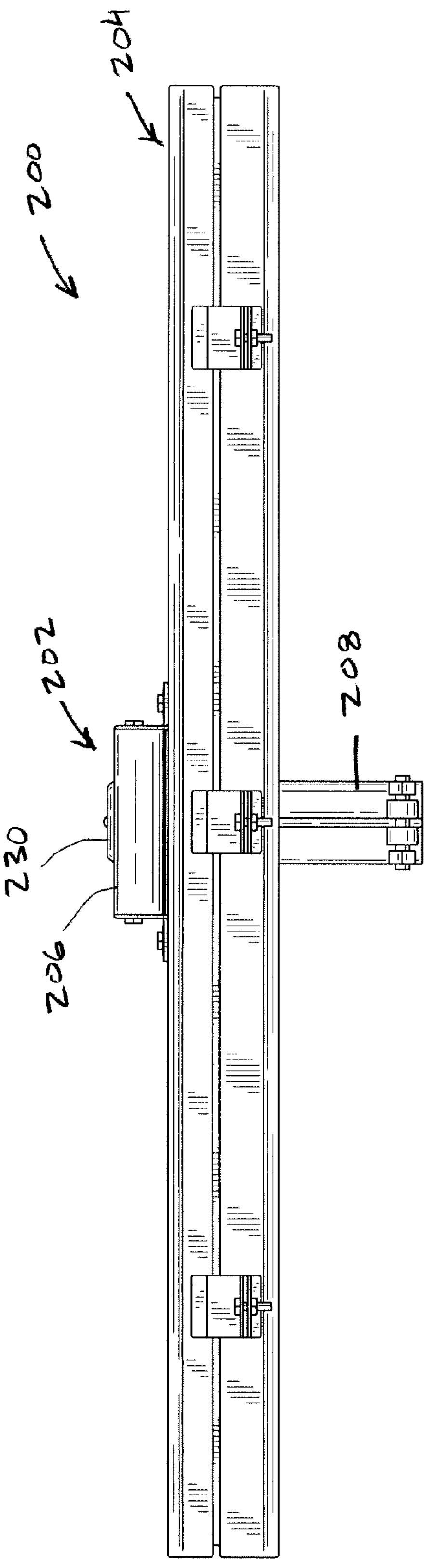
FIG. 2F is a schematic image of a front view of the fixture shown in FIGS. 2A-2E.
Figure 2G:
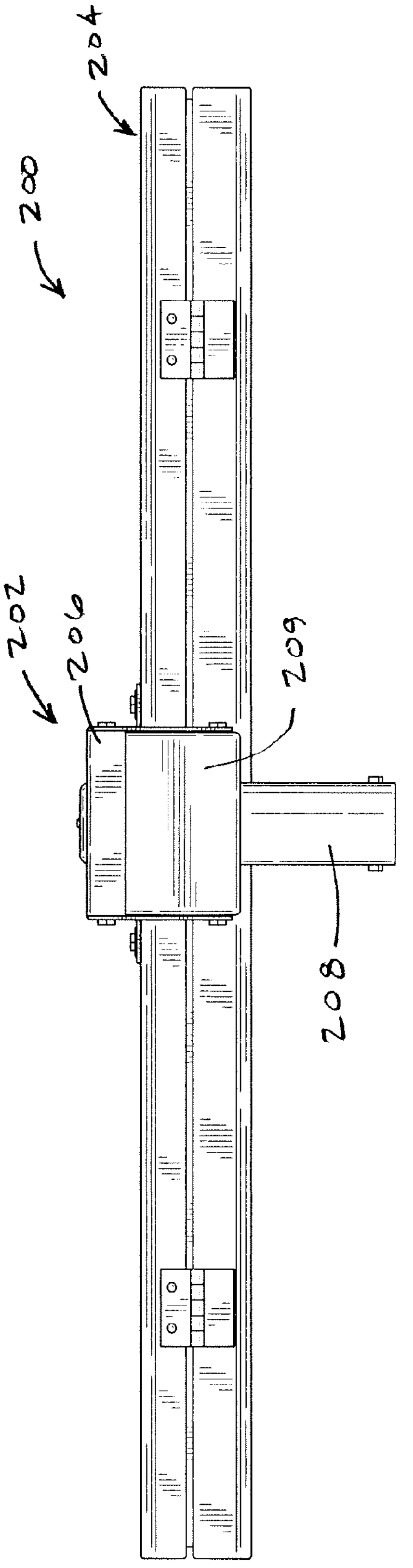
FIG. 2G is a schematic image of a rear view of the fixture shown in FIGS. 2A-2F.
Figure 2H:
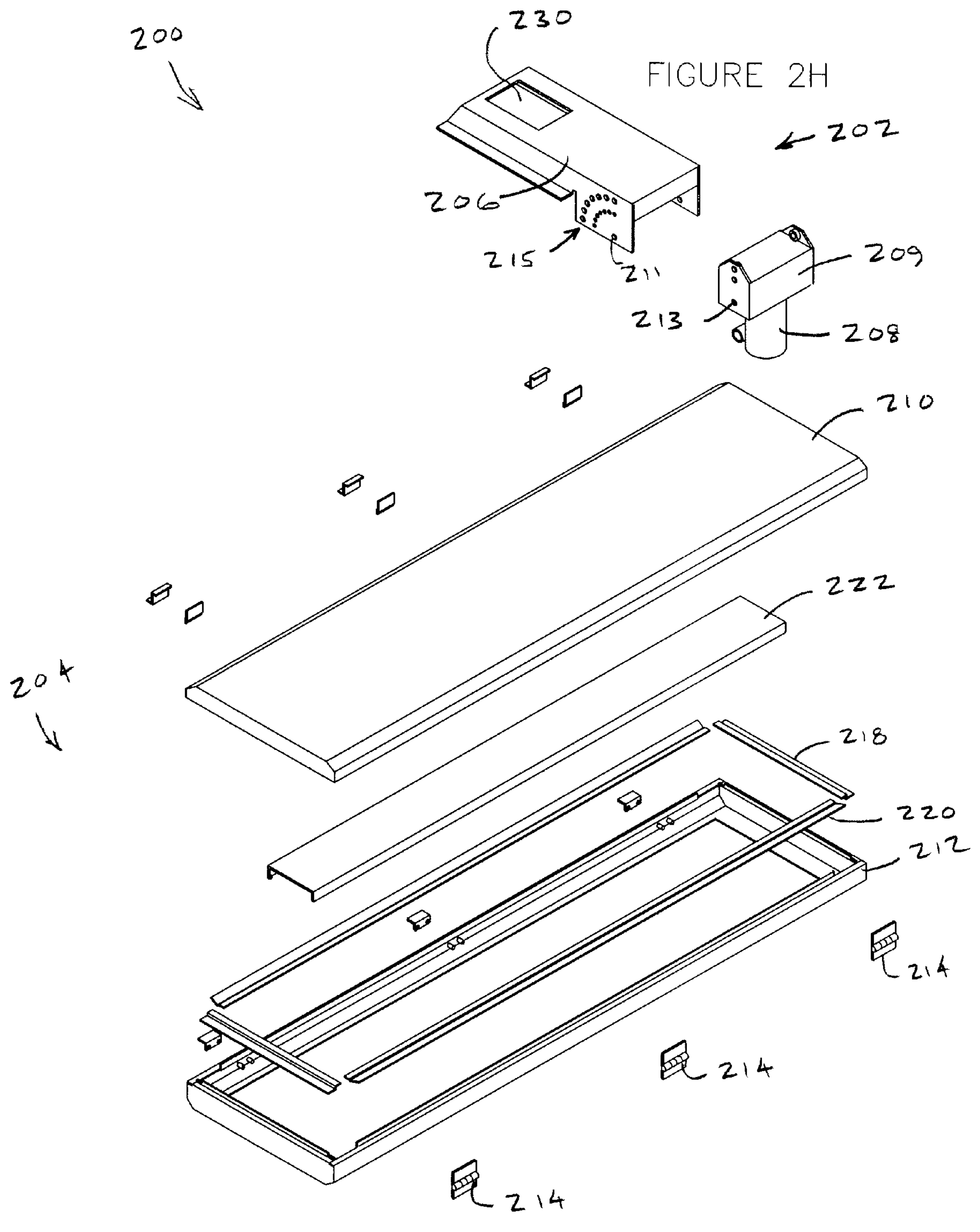
FIG. 2H is a schematic image of an exploded view of the outdoor fluorescent lighting fixture shown in FIGS. 2A-2G according to an exemplary embodiment.

Mount 206 is shown to include an opening 230 and is configured to receive a panel configured to cover the opening. In the embodiment shown in FIG. 2H, opening 230 is rectangular. FIG. 2B, for example, shows a view of a panel covering the opening. In the embodiment shown in FIG. 2B, the panel is shaped to cover the periphery of the opening and to secure to mount 206 via screws that are easily removed by a user. Opening 230 and its panel preferably provide user access to wiring or electronics housed within mount 206 and/or housing 204 without requiring the user to decouple mounting system 202 from housing 204 or from the pole. The embodiments shown in FIGS. 1A-1I are also shown to include an opening which may be used or configured similarly.

The mount may be made from a single bent sheet of metal, but could be formed from multiple sheets of metal or other structures. The mount is shown to include a rear fold, two side walls, two mounting wings, and a top which includes the opening. A fold extends down from the top rear of the mount and provides a "stop" against which pivot base 209 may rest to prevent negative rotation of the housing 204 relative to pivot base 209. Adjustment points 215 are shown as a plurality of holes in the side walls of mount 206. It should be noted that adjustment points 215 may be provided on both side walls (as shown) or only one of the side walls. As shown in the FIGURES, two rows of adjustment points are provided on the side walls of the mount. A first row provides a first set of adjustment angles while the second row provides a second set of adjustment angles that vary from the first set. In some embodiments only a single row or set of mounting points may be provided. In other embodiments, the adjustment points will not be organized in a row.

The wings of mount 206 extend away from mount 206 to provide a surface to which housing 204 may be coupled with a series of rivets, bolts, other fasteners, and/or via one or more welds. In some embodiments the wing may not be provided and other fastening methods and structures may be used to secure the mount to housing 204. In other embodiments, the mount may include tabs or wings that extend into the housing or fold beneath the mounting system and are not visible when the mounting system is coupled to the housing.

Figure 2I:
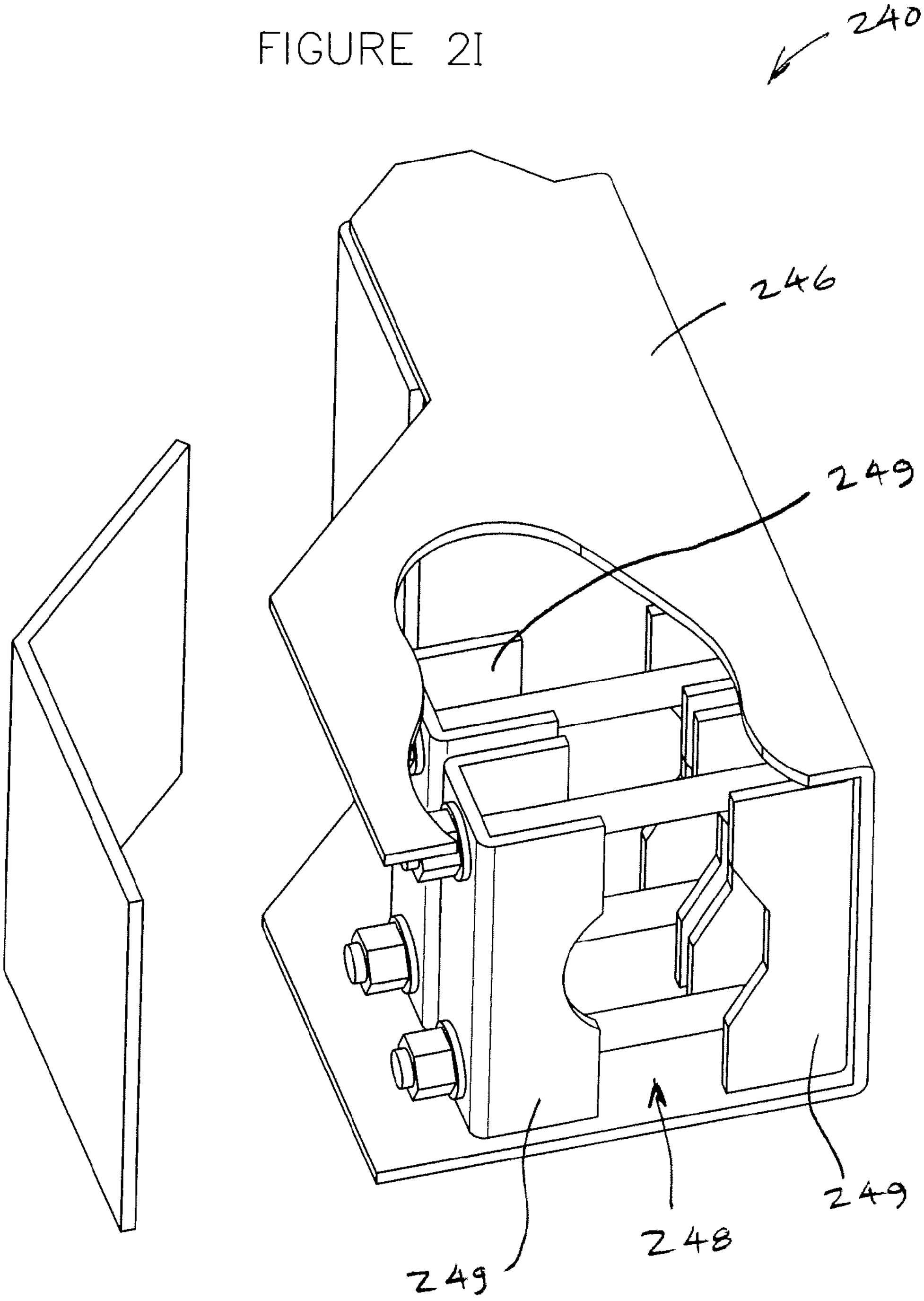
FIG. 2I is a schematic image of a perspective view of a pivot base having a saddle clamp arrangement for use in mounting an outdoor fluorescent lighting fixture according to an exemplary embodiment.

Referring to FIG. 2I, a mounting system 240 is shown according to another embodiment to include a mount 246 and gripping structure 248 (intended to grip a pole directly, or an adapter mounted to a pole or wall) which includes adjustable saddle components 249 configured to releasably secure the mounting system and light fixture to the pole or adaptor.

Figure 3A:
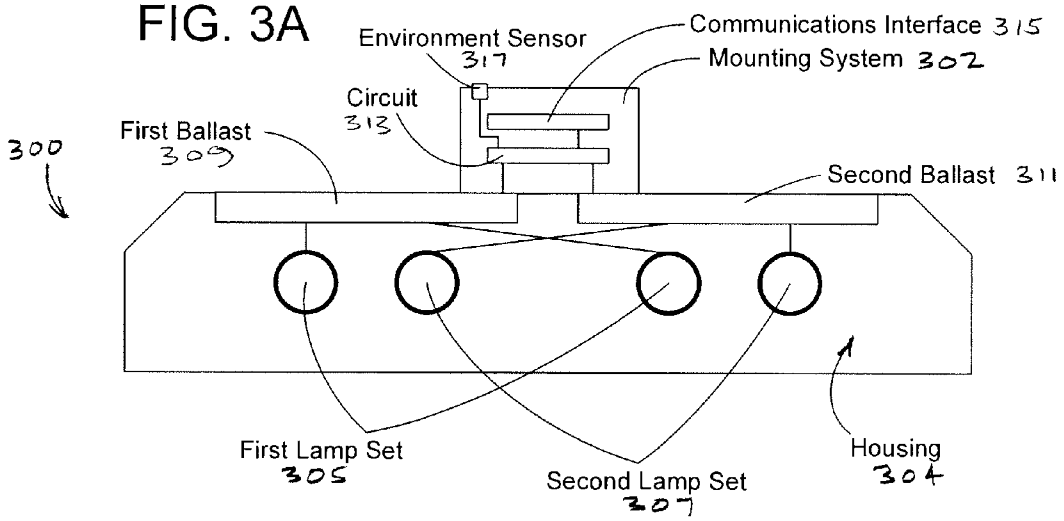
FIG. 3A is a diagram of a system for controlling the street light according to an exemplary embodiment.

FIG. 3A is a diagram of a system for controlling an outdoor lighting fixture 300 (e.g. street light, etc.) according to an exemplary embodiment. The system is shown to include a housing 304 and a mounting system 302 which may be the same as or different than those previously shown and described in this patent application. For example, electronics for the lighting fixture are shown inside the mounting system which may be the mounting system of FIG. 1A-1I or 2A-2I. The electronics may be user-accessible via an opening as shown in FIG. 1A-1I or 2A-2I. The diagram shown in FIG. 3A illustrates two lamp sets 305, 307 with two fluorescent lamps forming each lamp set, and two associated ballasts 309, 311. Each lamp set may include one or any number of additional fluorescent lamps. Further, while some embodiments described herein relate to providing redundant lamp sets and ballasts, it should be appreciated that many embodiments of the present application may only include a single lamp set and a single ballast. In other embodiments more than two ballasts and lamp sets may be included in a single lighting fixture. While the fluorescent lamps are illustrated as tube lamps extending lengthwise relative to the lighting fixture, the fluorescent lamps may be compact fluorescent bulbs, run perpendicular to the length of the lighting fixture, or be otherwise oriented.

Referring still to FIG. 3A, the fixture mounting system 302 is shown to include a circuit 313 and a communications interface 315. The circuit 313 is coupled to the ballasts 309, 311 and is configured to provide control signals to the ballasts. In other embodiments the circuit may be coupled to a relay or relays so that the circuit controllably switches the relay from providing power to the ballasts or from restricting power to the ballasts. The circuit 313 is further shown to include a communications interface 315 communicably connected to the circuit. According to an exemplary embodiment, the system shown in FIG. 3A is configured to receive control signals from a remote source via the communication interface. In other embodiments the system shown in FIG. 3A is also configured to provide information to one or more remote sources via the communications interface.

The communications interface 315 may be a wire interface (e.g., for receiving signals carried on a wire from a remote source) or a wireless interface (e.g., an optical or radio frequency-based transceiver for receiving signals from a remote source via a wireless transmission medium). In embodiments where the communications interface is of the wired type, the communications interface may be or include a wire terminal, hardware for interpreting analog or digital signals received at the wire terminal, or one or more jacks, connectors, plugs, filters, or other hardware (or software) for receiving and interpreting signals received via the wire from a remote source. In embodiments where the communications interface is of the wireless type, the communications interface may include an encoder, a modulator, an amplifier, a demodulator, a decoder, an antenna, one or more filters, one or more buffers, one or more logic modules for interpreting received transmissions, and/or one or more logic modules for appropriately formatting transmissions.

The circuit 313 shown in FIG. 3A is shown as being entirely enclosed within the mounting system 302 and as a single unit (e.g., single PCB, flexible PCB, separate PCB's but closely coupled). In other embodiments, however, the circuit may be distributed (e.g., having some components outside of the mounting system, having some components within the fixture housing, etc.).

FIG. 3A is further shown to include an environment sensor 317. The environment sensor 317 is shown as located at the top of the mounting system 302. In an exemplary embodiment, the environment sensor may protrude or be coupled to the top of the access cover shown in previous FIGURES In other embodiments, the environment sensor may be installed within the housing, to the underside of the housing, to the mounting system, or to any other part of the fixture. In yet other embodiments, the environment sensor may be remote from the fixture itself (e.g., coupled to a lower location on the pole, coupled to a street sign, coupled to a stop light, etc.). It should further be mentioned that one environment sensor may serve multiple fixtures. This may be accomplished by the environment sensor providing output signals to multiple fixtures or by the environment sensor providing output signals to a single fixture which is configured to forward the signals (or a representation or message derived from the signals) to other fixtures or to a master controller for action. The environment sensor 317 may be an occupancy sensor, a motion sensor, a photocell, an infrared sensor, a temperature sensor, or any other type of sensor for supporting the activities described herein. Circuitry associated with the sensor may be configured to cause the lamp to illuminate when movement is detected or based on some other logic determination using sensor input. In an exemplary embodiment, the circuitry may also be configured to send signals via a communication interface to a security monitor observed by security personnel. Receipt of these signals may cause a system controlling a pan-tilt-zoom security camera to aim toward the area covered by a light. The signals (or other alerts) may also be sent to other locations such as a police station system for action. For example, if activity continues occurring in a parking lot after-hours, as detected by occupancy sensors on a system of lighting fixtures as described herein, the lighting fixtures can each communicate (wired, wirelessly, etc.) this activity to a master controller and the master controller may send a request for inspection to security or police. Circuitry associated with an occupancy sensor may also be configured to turn the lighting fixture on for a period of time prior to turning the lighting fixture off if no further occupancy is detected.

Figure 3B:
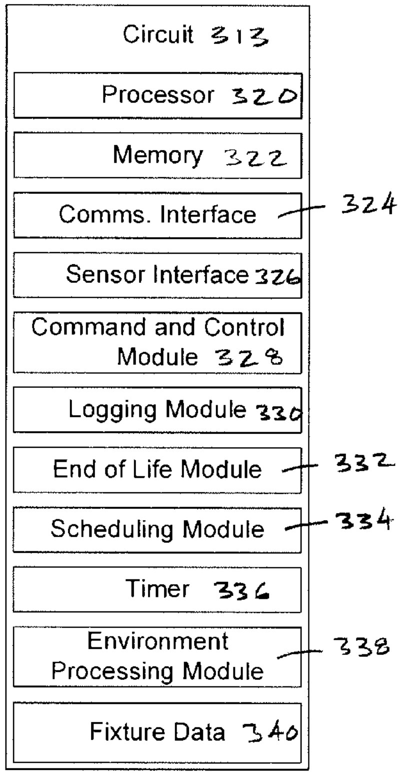
FIG. 3B is a block diagram of the circuit illustrated in FIG. 3A according to an exemplary embodiment.

Referring now to FIG. 3B, a block diagram of the circuit 313 illustrated in FIG. 3A is shown, according to an exemplary embodiment. In some embodiments activities of the circuit are controlled or facilitated using one or more processors 320 (e.g., a programmable integrated circuit, a field programmable gate array, an application specific integrated circuit, a general purpose processor, a processor configured to execute instructions it receives from memory, etc.). In other embodiments, activities of the circuit are controlled and facilitated without the use of one or more processors and are implemented via a circuit of analog and/or digital electronics components. The memory 322 of the circuit 313 of FIG. 3B may be computer memory, semiconductor-based, volatile, non-volatile, random access memory, flash memory, magnetic core memory, or any other suitable memory for storing information.

The circuit 313 is further shown to include a communications interface 324 and a sensor interface 326. The communications interface 324 may be integrated with the circuit 313 rather than being separate (such as the separate communications interface 315 shown in FIG. 3A). In other embodiments, the communications interface 324 on the circuit 313 may be configured to control, drive, or otherwise communicate with the communications interface 315 shown in FIG. 3A. In yet other embodiments, the communications interface 324 of FIG. 3B may be of a first type and the communications interface 315 shown in FIG. 3A may be of a second type. For example, the communications interface 324 of FIG. 3B may be a wire interface for communicating with existing municipal street light circuits, schedulers, or networks while the communications interface 315 of FIG. 3A may be a radio frequency transceiver for communicating with other remote sources or networks. In the present application, the term transceiver may refer to an integrated transmitter and receiver pair or a separate transmitter and receiver.

The sensor interface 326 may be configured to receive signals from the environment sensor 317. The sensor interface 326 may include any number of jacks, terminals, solder points or other connectors for receiving a wire or lead from the environment sensor 317. The sensor interface 326 may also or alternatively be a radio frequency transceiver or receiver for receiving signals from wireless sensors. For example, the sensor interface 326 may be a Bluetooth protocol compatible transceiver, a ZigBee transceiver, or any other standard or proprietary transceiver. Regardless of the communication medium used, the sensor interface 326 may include filters, analog to digital converters, buffers, or other components configured to handle signals received from the environment sensor. The sensor interface 326 may be configured to provide the result of any signal transformation (or the raw signal) to the circuit for further processing.

The circuit 313 is further shown to include a command & control module 328, a logging module 330, an end of life module 332, a scheduling module 334, a timer 336, an environment processing module 338, and fixture data 340. Using signals received from communications electronics of the lighting fixture and/or signals received from one or more sensors (e.g., photocells, occupancy sensors, etc.), the command & control module 328 is configured to control the ballasts 309, 311 and lamps 305, 307 of the fixture 300. The command & control module 328 may include the primary control algorithm/loop for operating the fixture and may call, initiate, pass values to, receive values from, or otherwise use the other modules of the circuit 313. For example, the command & control module 328 may primarily operate the fixture using a schedule as described below with respect to the scheduling module, but may allow upstream or peer control (e.g., "override control") to allow a remote source to cause the ballast/lamps to turn on or off. The command & control module may be used to control 2-way communication using communications electronics of the lighting fixture.

The logging module 330 is configured to identify and store fixture event information. For example, the logging module 330 may be configured to identify (e.g., by receiving a signal from another component of the circuit 313) when the lamps of the fixture are being or have been turned off or turned on. These events may be recorded by the logging module 330 with a date/time stamp and with any other data. For example, the logging module 330 may record each event as a row in a two dimensional table (e.g., implemented as a part of a relational database, implemented as a flat file stored in memory, etc.) with the fields such as event name, event date/time, event cause, event source. One module that may utilize such information is the end of life module 332 also shown in FIG. 3B. The end of life module 332 may generally be configured to implement the steps of the process shown in FIG. 3C. In other words, the end of life module 332 may compile a time of use total by querying or otherwise aggregating the data stored by the logging module 330. Events logged by the system may be transmitted using the communications interfaces or other electronics to a remote source via a wired or wireless connection. Messages transmitting logged events or data may include an identifier unique to the lighting fixture (e.g., lighting fixture's communication hardware) that identify the fixture specifically. In addition to the activities of the end of life module shown below, the command and control module 328 may be configured to cause communications electronics of the fixture to transmit messages from the log or other messages upon identifying a failure (e.g., a power supply failure, a control system failure, a ballast failure, a lamp failure, etc.). While the logging module 330 may be primarily used to log on/off events, the logging module (or another module of the control system) may log energy draw (or some value derived from energy draw such as a carbon equivalent amount) by the lighting fixture 300.

FIG. 3B is further shown to include a scheduling module 334. The scheduling module 334 may be used by the circuit 313 to determine when the lamps 305, 307 of the lighting fixture 300 should be turned on or off. The scheduling module 334 may only consider time, or may also consider inputs received from the environment sensor 317 (e.g., indicating that it is night out and that artificial light is necessary). The scheduling module 334 may access a schedule stored in memory 322 of the circuit 313 to carry out its tasks. In some embodiments schedule data may be user-updatable via a remote source and transmitted to the fixture via the circuit 313 and a communications interface. While the end of life module 332 may utilize an actual log of fixture events as described in the previous paragraph, in some embodiments the end of life module 332 may utilize scheduling information to make an end of life determination. In yet other embodiments, the logging module 330 may receive data from the scheduling module 334 to create its log. FIG. 3B is further shown to include a timer 336 that may be used by the circuit 313 to maintain a date/time for use by or for checking against information of the scheduling module 334, the end of life module 332, or the logging module 330. The environment processing module 338 shown in FIG. 3B may be configured to process signals received from one or more sensors such as the environment sensor 317. The environment processing module 338 may be configured to, for example, keep the lamp of the lighting fixture 300 turned off between the hours of one and five A.M. if there is no movement detected by a nearby environment sensor. In other embodiments, the environment processing module 338 may interpret the signals received from sensors but may not make final fixture behavior determinations. In such embodiments, a main logic module for the circuit or logic included in the processor 320 or memory 322 may make the fixture behavior determinations using input from, for example, the environment processing module 338, the scheduling module 334, and the timer 336.

Figure 3C:
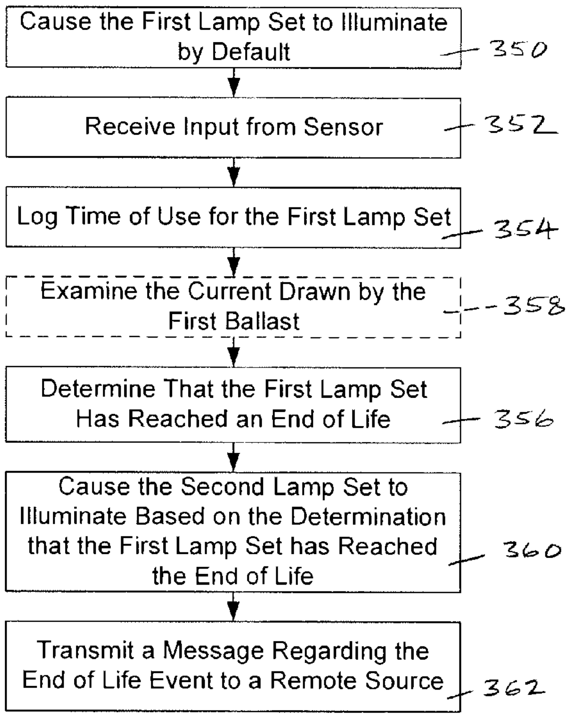
FIG. 3C is a flow chart of a process for handling lamp end of life events, according to an exemplary embodiment.

FIG. 3C is a flow chart of a process for handling lamp end of life events, according to an exemplary embodiment. The process is shown to include a step 350 to use the lighting fixture's circuit to cause the first lamp set to illuminate by default. In other words, when the fixture receives a command from an outside source or generates a command internally to "turn on," a circuit of the fixture will cause a first lamp set to illuminate but will not illuminate at least one other lamp set. In an exemplary embodiment shown in step 352, the circuit is configured to make its own determination that the fixture should be turned on based on input signals received from an environmental sensor. For example, when ambient light is determined to be low based on input from a photocell, the circuit may cause a relay to provide power to the first ballast for illuminating the first lamp set. Regardless of the source of the "turn on" command, in step 354, the circuit is configured to log the time of use for the first lamp set. For example, when the circuit turns the lamp on for any reason, the circuit may record a start time and when the circuit turns the lamp off for any reason, the circuit may record a stop time. Using an aggregation of the time of use for the first lamp set, the circuit in step 356 determines whether or not the first lamp set has reached an end of life. "End of life" for the purpose of this disclosure can mean an actual or theoretical end of life for a fluorescent lamp. If time of use is used to determine a lamp end of life, the end of life conclusion is theoretical and in an exemplary embodiment the end of life conclusion will be made when the time of use is just prior to, just after, or approximately the same as an estimated failure time for the lamp type or model utilized. As shown in FIG. 3C, steps other than logging time, such as step 358 to examine the current drawn by the first ballast, may be used in the determination of whether the first lamp set has reached an end of life. Such steps may be used by the circuit to make a determination that a fluorescent lamp is actually at the end of life. In some cases the examination of current may be detected by lamp or ballast "failsafe" circuitry configured to detect current overrun. In other embodiments, the circuitry that examines current for an end of life condition may be a switch that changes states if the ballast/lamp is turned "on" but current after what should have been a start-up period is below a threshold or non-existent. In other embodiments, the circuitry that checks for an end of life condition can receive input from an optical sensor mounted within the housing, to the exterior of the ballast, or otherwise configured to sense whether the lamps are illuminated. If the intensity of the light received at the optical sensor is below a threshold while the ballast/lamp should be turned "on", for example, circuitry may determine that the first lamp set has reached an end of life.

Referring still to FIG. 3C, the process is shown to include step 360 to cause the second lamp set to illuminate based on the determination that the first lamp set has reached the end of life. Accordingly, the circuit controlling the process of FIG. 3C can be configured to switch from utilization of the first lamp set to a "backup" lamp set (the second lamp set) when the first lamp set is determined to have reached an end of life. Applicants have found that such a "switch over" feature can provide outdoor lighting fixtures of the fluorescent type described herein with an overall time before maintenance parameter that is more acceptable to outdoor lighting fixture purchasers than conventional fluorescent lamps.

Referring yet further to FIG. 3C, the process may also include one or more steps for communicating the "switch" from a primary ballast or first lamp set to a secondary ballast or first lamp set. As illustrated in FIG. 3C, these steps may include step 362 to transmit a data message regarding the end of life event to a remote source. According to an exemplary embodiment, the remote source may be a maintenance center configured to alert service personnel to replace the first lamp set within a calculated period of time (e.g., a period of time coinciding with the second lamp set's expected end of life). Applicants believe that this combination of features may advantageously prevent undesirable periods of time without light—after one lamp set has failed, another is still illuminated while service is scheduled to replace the first lamp set. As previously indicated that transmission of a data message may be completed via a wired communications interface or via a wireless communications interface. Further, the transmission of the data message may be direct to a recipient or travel through one or more other sources. For example, in a parking lot with multiple lighting fixtures configured with wireless transceivers, each lighting fixture may include a relatively low-powered wireless device that transmits data to another nearby lighting fixture. Some of the lighting fixtures may include communications interfaces configured as relaying interfaces such that when such a message from another transceiver is received, the relaying transceiver forwards the message on to yet other systems. In an exemplary embodiment, a set of lighting fixtures at any given site includes a master transceiver that collects information from all of the lighting fixtures of the site. The master transceiver may then communicate the information (compiled, aggregated, transformed, or in a raw form) to another server or source for processing (e.g., by a service contractor). The transceivers of the present application may generally be configured to include features disclosed in U.S. patent application Ser. No. 12/550,270 titled "Lighting Fixture Control Systems and Methods" and filed on Aug. 29, 2009, the complete disclosure of which is hereby incorporated by reference herein.

Referring still to FIG. 3C, in some embodiments the lighting fixture may not include a transceiver or communications interface for communicating information regarding the end of life event or corresponding "switch", but may rather include a visual indicator (e.g., a mechanical switch that is visible upon inspection of the lighting fixture, an LED or other light source that is visible, etc.) that may indicate to service personnel briefly inspecting the lighting fixture that one of the lamp sets has reached its end of life and should be replaced.

Further, the switch from a first lamp set to a second lamp set may be repeated and three, four, or more lamp sets may be included in any given lighting fixture. As one lamp set fails, fixture circuitry causes another lamp set to illuminate. In such an embodiment, when the last lamp set is used for illumination, the message regarding end of life or otherwise indicating that service is necessary may be transmitted from a communications interface of the lighting fixture. In various embodiments of lighting fixtures and circuitry configured to implement the process shown in FIG. 3C, only a single ballast may be provided and the circuitry that makes an end of life determination may cause the single ballast to switch from providing current to the first lamp set to providing current to the second lamp set. In embodiments with more than two lamp sets, a series of switches may be included for allowing a single ballast to be provided for driving a series of sequentially utilized lamp sets.

Referring generally to FIGS. 4A-4D, systems and methods for replacing energy intensive conventional outdoor lighting fixtures with energy efficient fluorescent fixtures (as described above or otherwise) are shown and described, according to various exemplary embodiments.

Figure 4A:
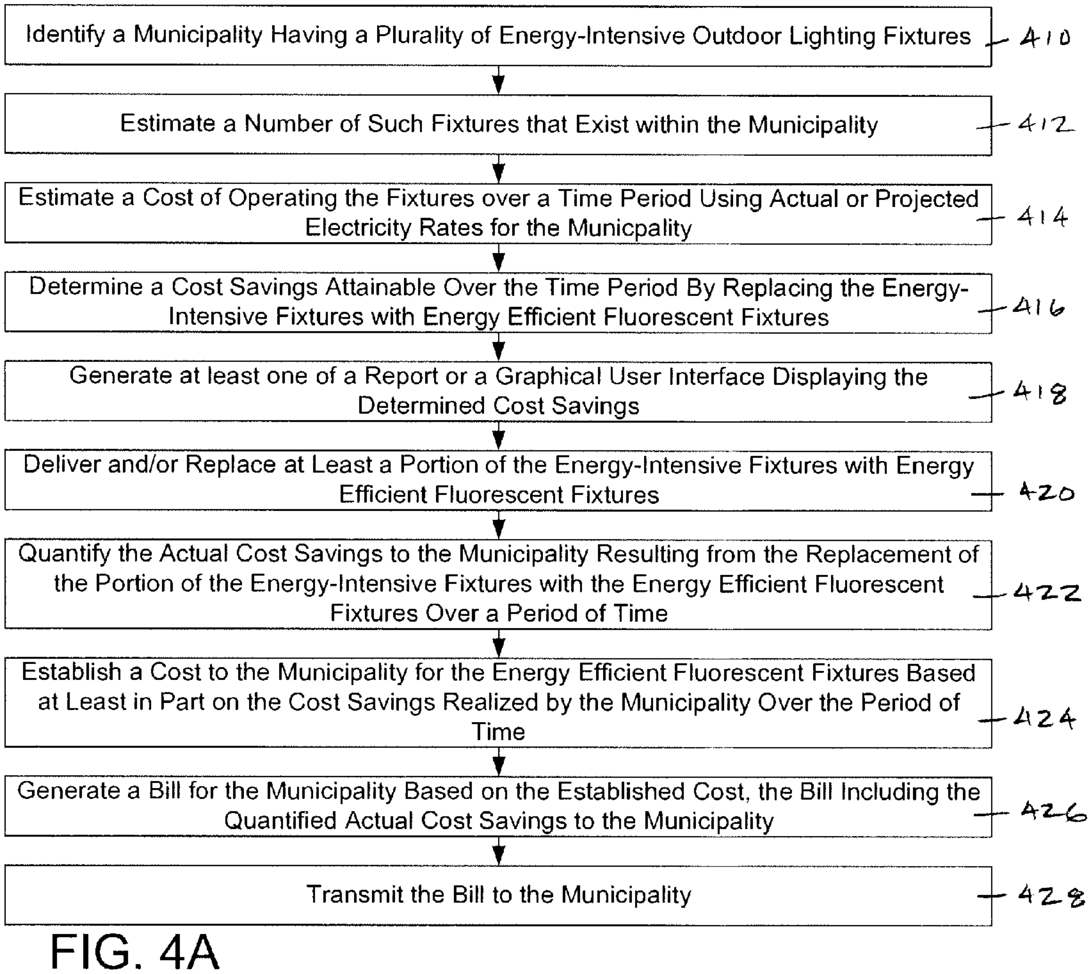
FIGS. 4A-4D are block diagrams of systems and methods for replacing energy intensive conventional outdoor lighting fixtures with energy efficient fluorescent fixtures according to various exemplary embodiments.

Referring now to FIG. 4A, a process for replacing energy intensive conventional outdoor lighting fixtures is shown. The process includes step 410 to identify a municipality having a plurality of energy-intensive outdoor lighting fixtures. The process is also shown to include step 412 to estimate a number of such fixtures that exist within the municipality and step 414 to estimate a cost of operating the fixtures over a time period using actual or projected electricity rates for the municipality. Using the estimated cost, step 416 determines a cost savings attainable over the period of time (or another period of time) by replacing the energy-intensive fixtures with energy efficient fluorescent fixtures may be determined. Subsequently, step 418 involves generating at least one of a report or graphical user interface to display the determined cost savings. The report or the graphical user interface may be communicated to the municipality (or to a decision maker at the municipality) in paper form, computer-readable medium form, via a web site, or otherwise. Assuming an order to proceed with the replacement, the process further includes step 420 to deliver and/or replace at least a portion of the energy-intensive fixtures with the energy efficient fixtures. After the fixtures are actually installed, the process may include step 422 to quantify the actual cost savings to the municipality resulting from the replacement of the portion of energy-intensive fixtures with the energy efficient fluorescent fixtures. If the municipality paid for the fixtures prior to installation, the following steps may be omitted. However, in step 424 one envisioned way to sell the energy efficient fluorescent fixtures to the municipality is to establish a cost after installation and after the actual cost savings has been quantified per the previous steps. Accordingly, in some exemplary embodiments the process includes establishing a cost to the municipality for the energy efficient fluorescent fixtures based at least in part on the cost savings realized by the municipality over the period of time. The process further includes step 426 to generate a bill for the municipality based on the established cost. The bill may include a textural and/or graphical representation of the quantified actual cost savings to the municipality. In step 428, the bill may then be transmitted (e.g., via the Internet, via e-mail, via regular mail, via fax, etc.) to the municipality.

Figure 4B:
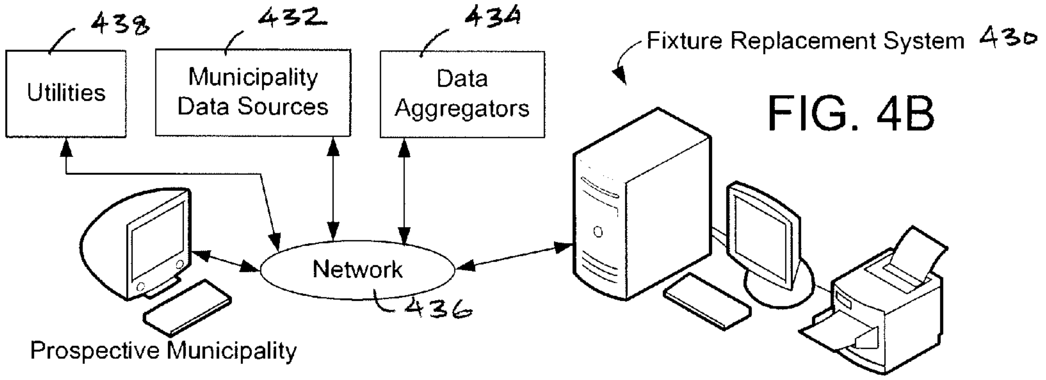

Referring now to FIG. 4B, a system configured to complete many of the activities described in FIG. 4A is shown, according to an exemplary embodiment. The system includes a server or other computing machine labeled as a fixture replacement system 430 configured to complete the processing steps described above. The fixture replacement system 430 may receive municipality data regarding the number of fixtures, current utility costs, the types of fixtures utilized, and the like from municipality data sources 432 or from a third party data aggregator 434. The municipality data may be received as a database of information, one or more e-mail messages, paper files, or via any other medium. In an exemplary embodiment, the municipality data is entered to a client at the prospective municipality, municipality data sources or data aggregator and transmitted via a network 436 (e.g., LAN, WAN, Internet, etc.) to a server process included with the fixture replacement system 430. Using this data, the server process may provide the information to one or more calculation modules and to provide a response to the client (e.g., in the form of the generated report or graphical user interface) back via the network. Rate information (e.g., actual or projected) may be received directly from utilities 438, from the prospective municipality, from municipality data sources, or from third party data aggregators. The rate information may also be entered directly to the fixture replacement system via a local user interface (e.g., keyboard, monitor, mouse, touch screen, etc.) and used by the server process or a supporting calculation module to complete the steps described in FIG. 4A. Further, actual cost information may be received from any number of the data sources shown in FIG. 4B or other sources. For example, once a municipality receives its utility bill, the municipality may enter a website served by the fixture replacement system, enter their actual costs, and the server will establish a cost to the municipality based on the received information. Similarly, bills may be electronic ("e-bills") transmitted from the fixture replacement system to the municipality over a web interface, over e-mail, or via another B2B connection mechanism (e.g., directly into a service of the municipality accounting system).

Figure 4C:
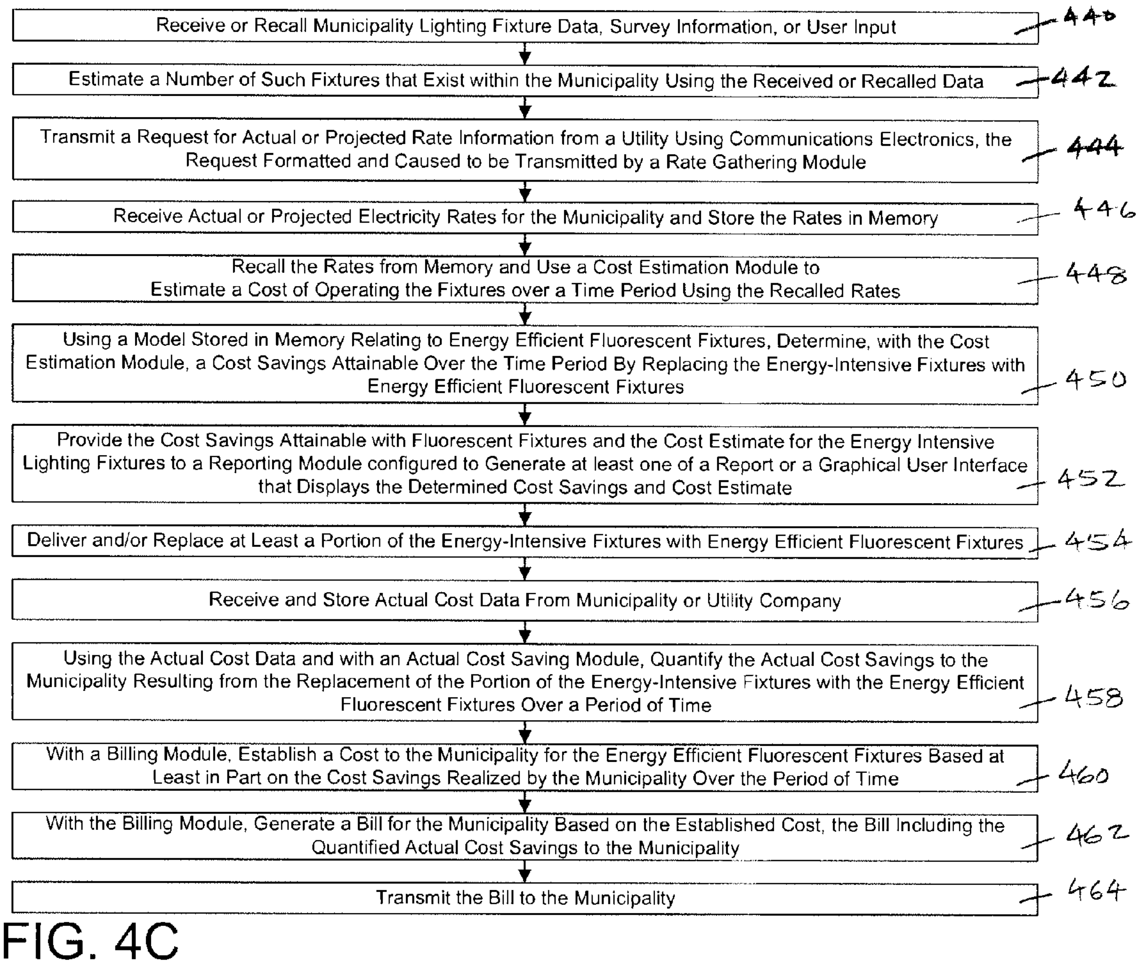
Figure 4D:
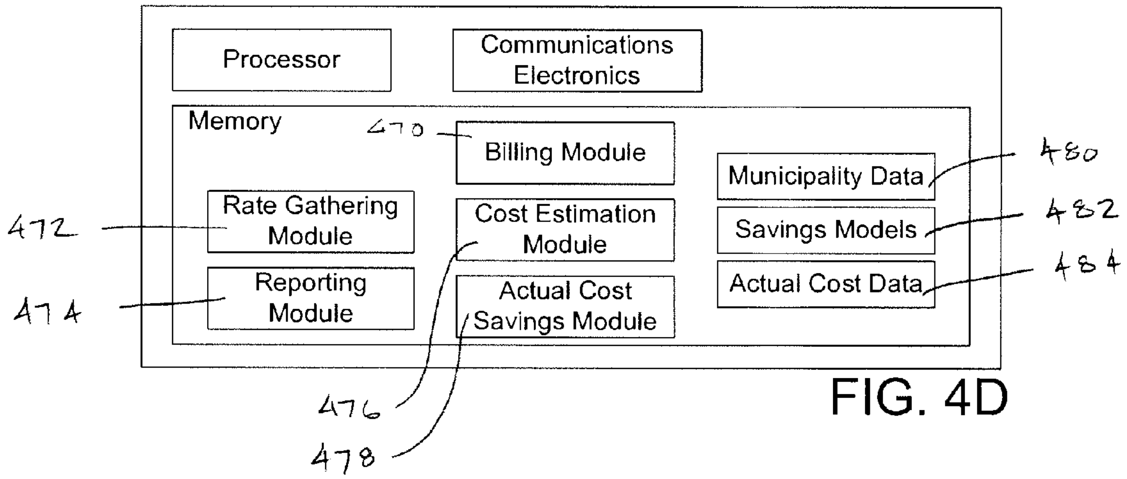

Referring now to FIGS. 4C and 4D, a more detailed process and system for utilizing a server-based fixture replacement system 430 is shown. The process includes steps 440, 442, 444, 446, 448, 450, 452, 454, 456, 458, 460, 462 and 464 as shown in FIG. 4C. The modules of FIG. 4D may be computer code modules, object code modules, script modules, sections of a single computer code file to be executed, or other modules that configure a processor or processing system for completion of the activities described for the modules in FIG. 4A. According to the embodiment illustrated in FIG. 4D, the modules are shown by way of example to include a billing module 470, a rate gathering module 472, a reporting module 474, a cost estimation module 476, an actual cost savings module 478, a municipality data module 480, a module for savings models 482 and an actual cost data module 484.

By utilizing the lighting fixtures and control activities described in FIGS. 1A-3C and the systems and methods described in FIGS. 4A-D, a municipality or other group may reduce their night time power loads. In the event that the price of night time power increases to be closer to that of peak power times, the subject matter of the present application may provide even greater cost savings than may currently be realized.

Figure 5B:
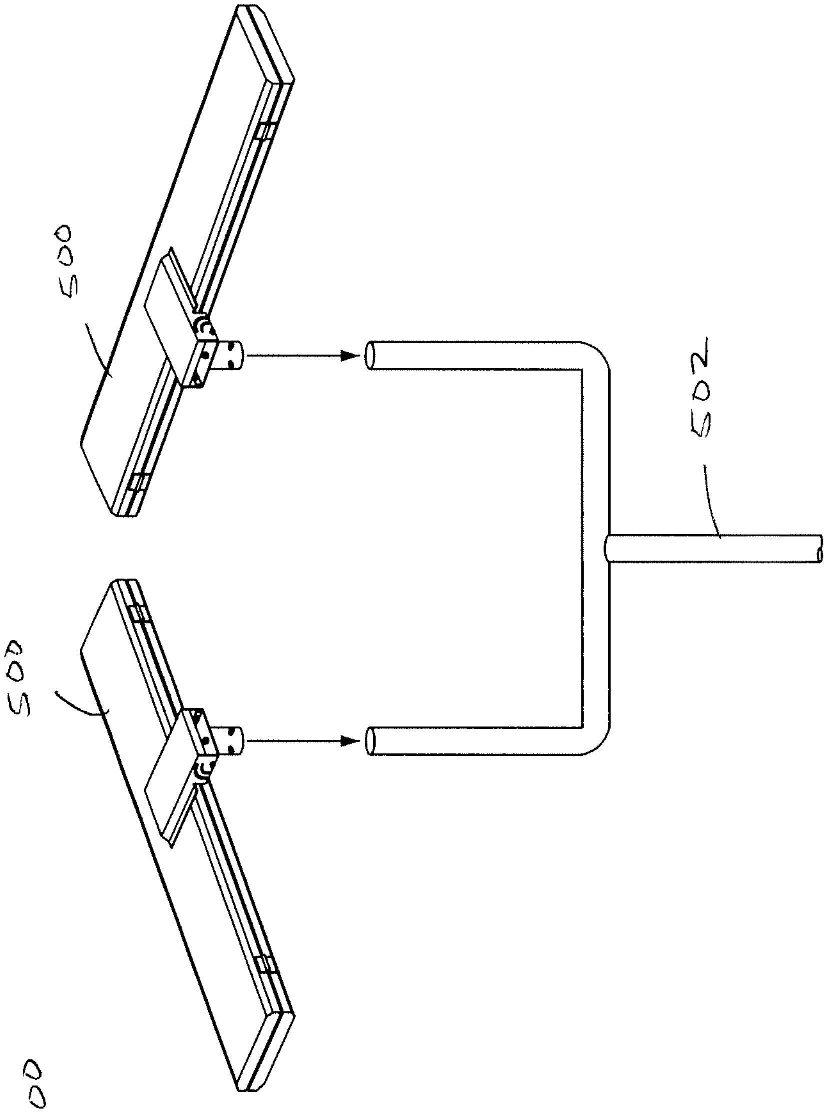
FIGS. 5A-5C are schematic images of a perspective view of a slip-fit mounting arrangement for a lighting fixture on a pole, according to exemplary embodiments.
Figure 5A:
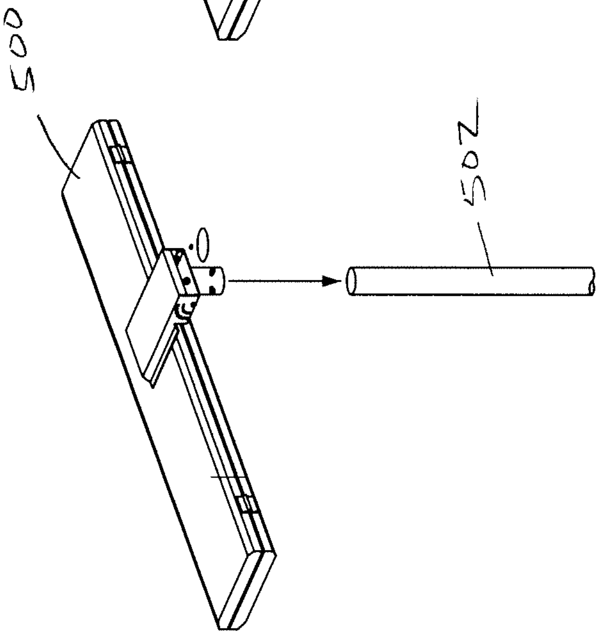
Figure 5C:
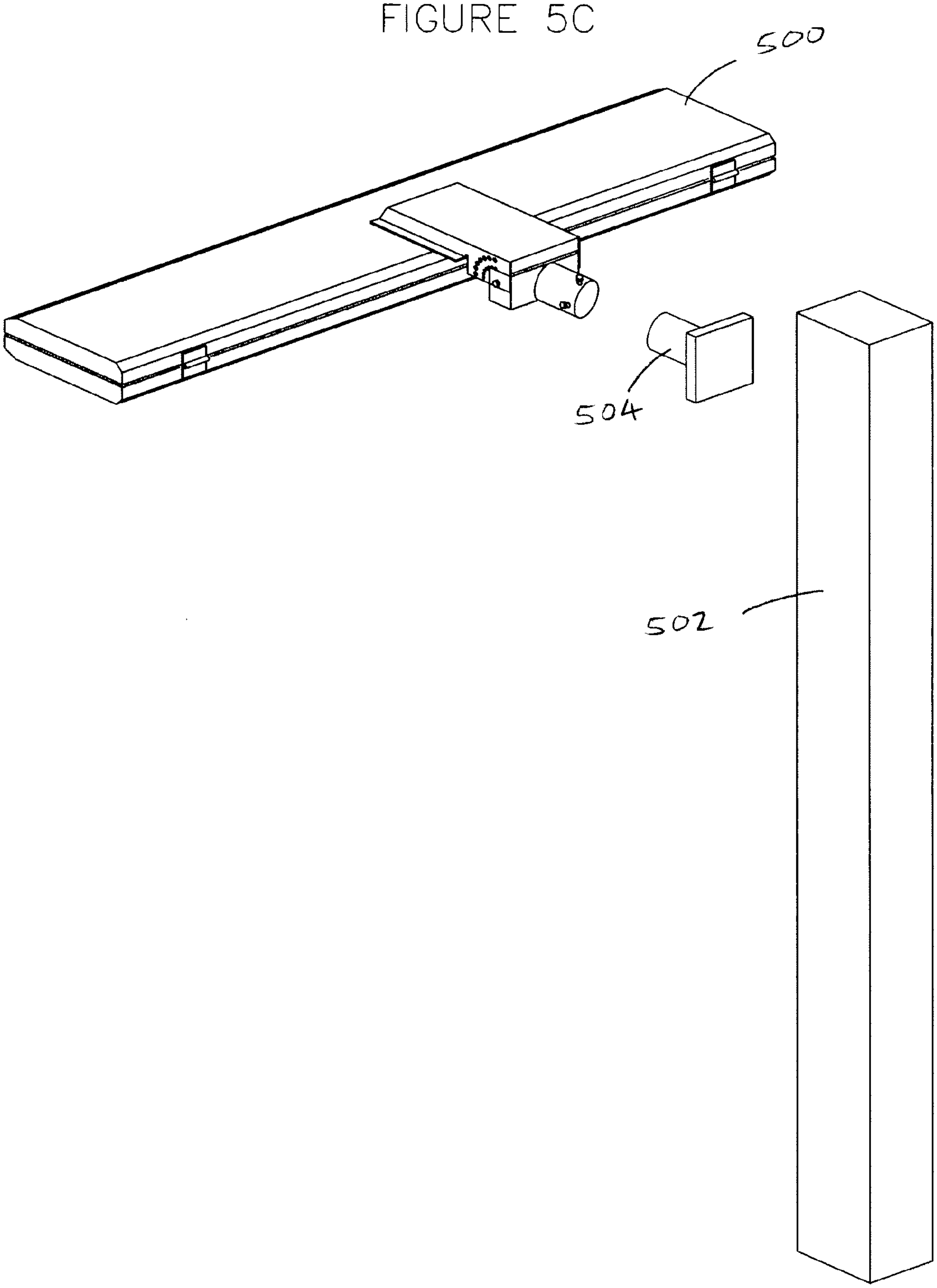

Referring to now to FIGS. 5A-5C perspective views of a vertical or adjustable-to-vertical mount are shown being used to fit lighting fixtures 500 (such as those shown in FIGS. 1A-2I) to different pole configurations, according to various exemplary embodiments. According to the illustrated embodiments, a mounting arrangement such as mount 106 (see FIG. 1J), or mount 206 (see FIG. 2H), or mount 246 (see FIG. 2I), or other suitable mounting arrangement may be used to couple lighting fixtures to the top vertical ends of poles 502 in the manner shown in FIGS. 5A-5B, or to a side of a pole 502 using a suitable adaptor 504 as shown in FIG. 5C (which shows a lighting fixture having a horizontal or adjustable-to-horizontal mount, with the lighting fixture coupled to a square pole via an adapter that bolts to the pole to provide an extension (i.e., tenon assembly) around which a cylindrical slip-fit mount or a saddle-type clamp can extend).

Figure 6A:
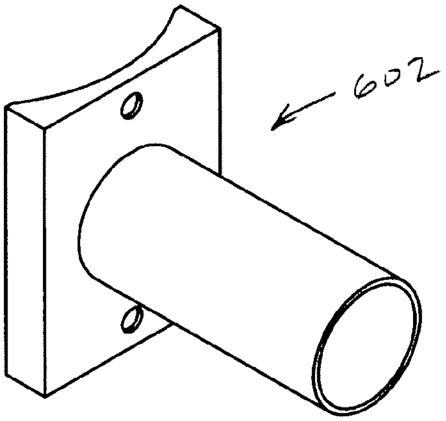
FIGS. 6A-6E are schematic images of a perspective view of adaptors for mounting a lighting fixture on a pole, according to exemplary embodiments.
Figure 6B:
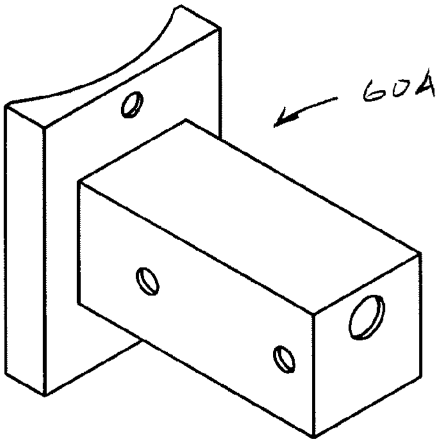
Figure 6C:
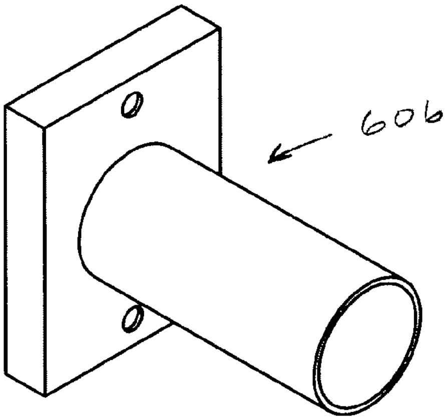
Figure 6D:
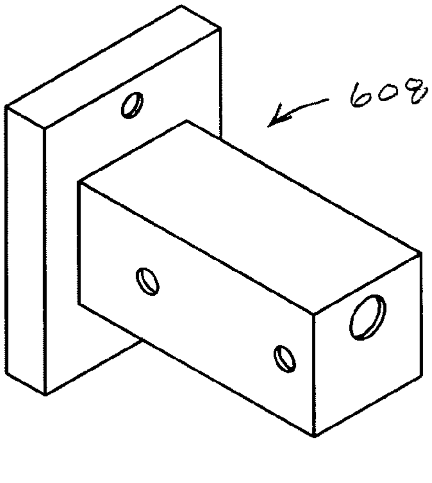
Figure 6E:
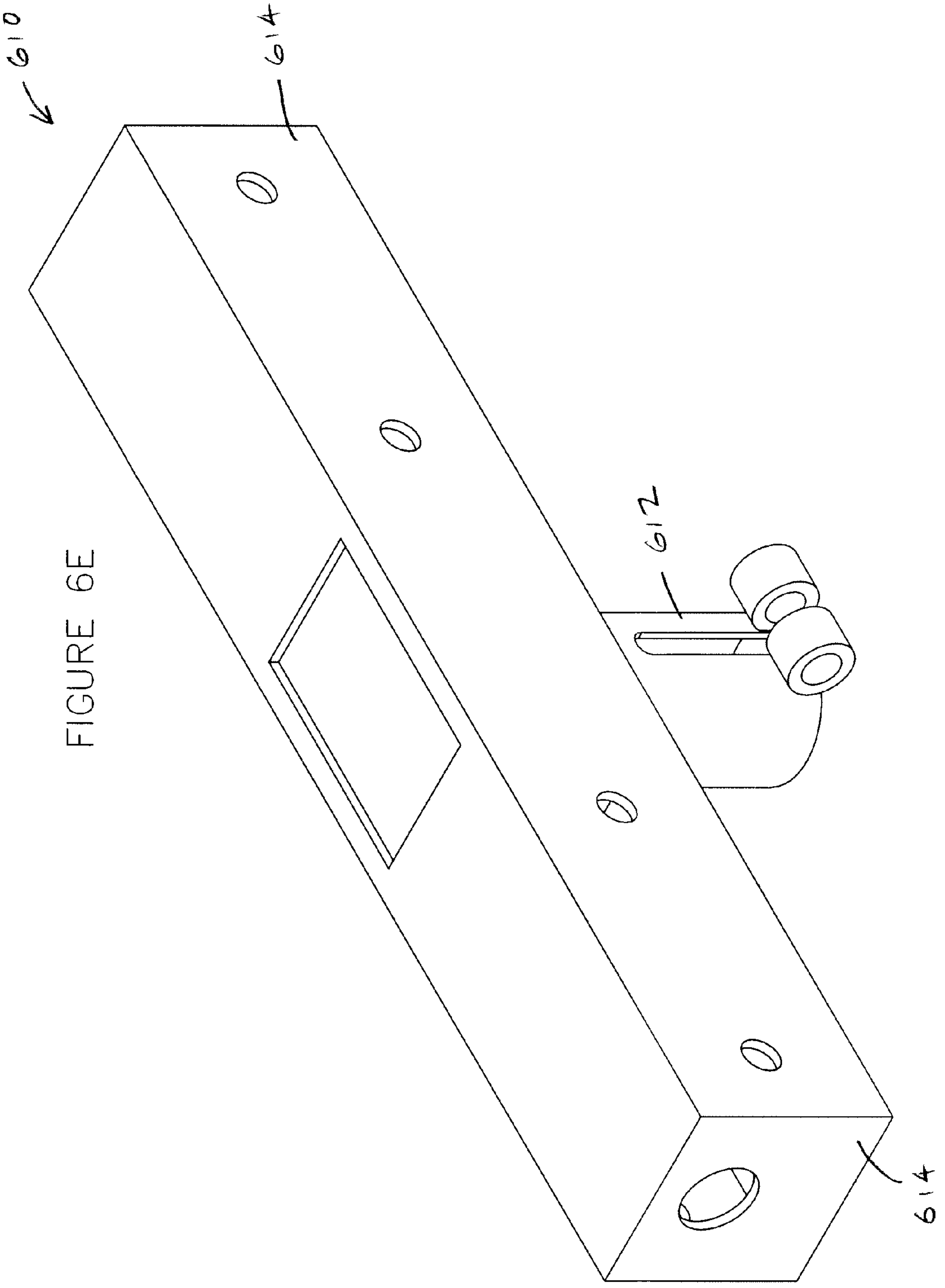
Figure 6F:
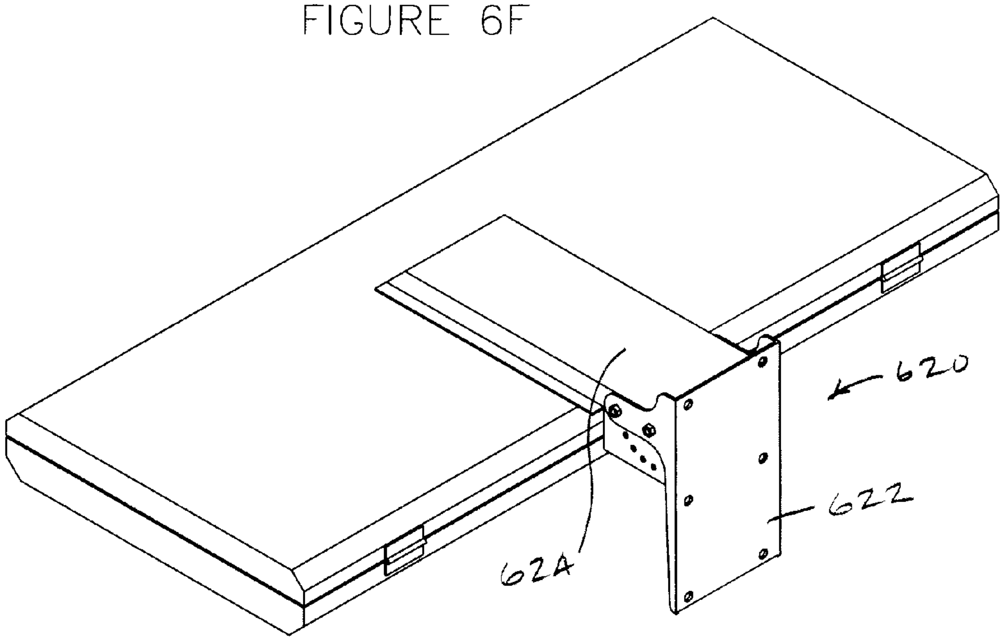
FIGS. 6F-6G are schematic images of a perspective view of adaptors for mounting a lighting fixture on a planar surface (e.g. wall, etc.), according to exemplary embodiments.
Figure 6G:
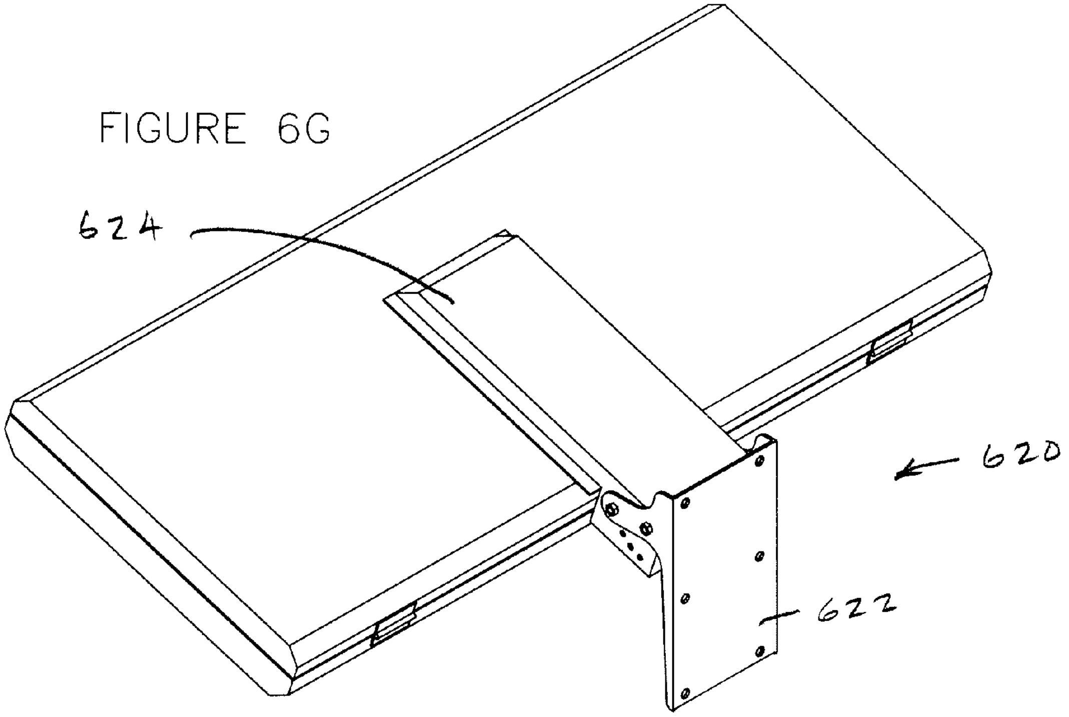

FIGS. 6A-6D shows pole brackets and adapters for allowing lighting fixture mounting brackets to be attached to the sides of existing vertical poles (e.g., square or round), according to various exemplary embodiments. FIGS. 6A and 6B shows two round pole bracket adapters (602 with a round tenon or stub, and 604 with a rectangular tenon or stub) or assemblies, according to exemplary embodiments. FIGS. 6C and 6D show two square pole bracket adapters (606 with a round tenon or stub, and 608 with a rectangular tenon or stub), according to an exemplary embodiment. FIG. 6E is an illustration of a pole top bracket assembly 610, according to an exemplary embodiment. The cylindrical compression sleeve 612 is configured to fit and secure around a vertical pole to provide two square arms 614 to which square mounting brackets for lighting fixtures can be attached. According to an alternative embodiment, other mounting arrangements, such as a saddle type mounting arrangement (such as shown by way of example in FIG. 2I) may be provided instead of a cylindrical compression sleeve. FIGS. 6F-6G show a wall mount bracket assembly 620 for coupling a lighting fixture to a wall, according to an exemplary embodiment. Assembly 620 includes a base portion 622 that is attachable to a surface such as a wall or the like, and a mount portion 624 that permits the lighting fixture to be adjustable positioned in any one of a variety of angles to provide the desired illumination.

Figure 7A:
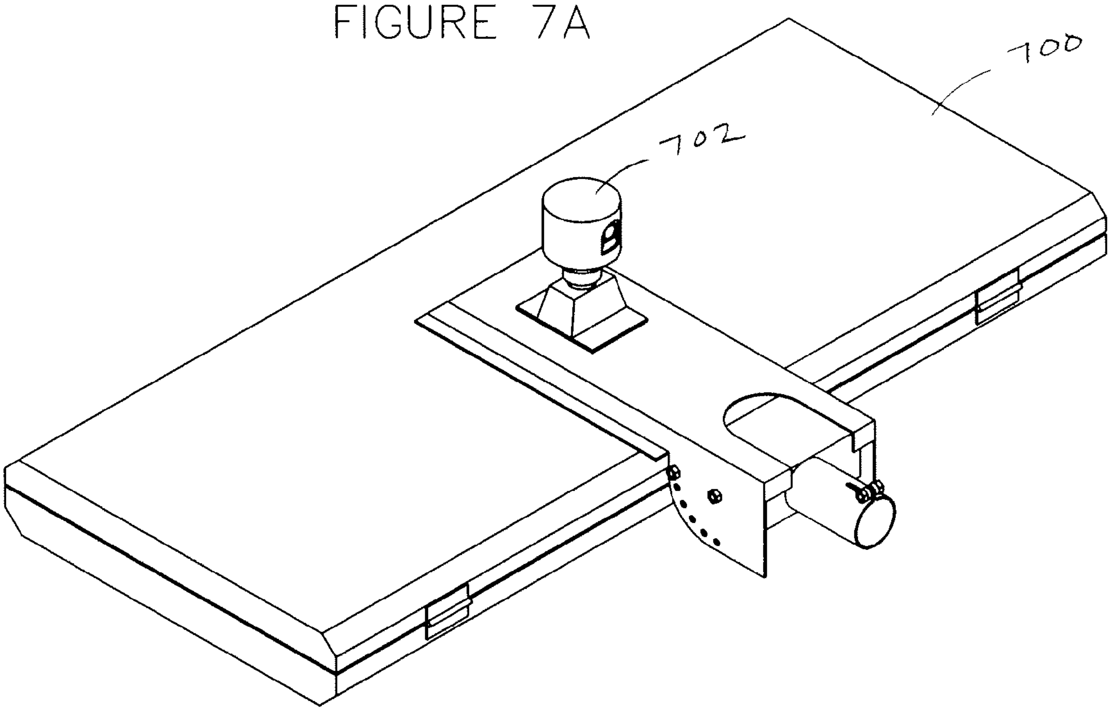
FIGS. 7A-7B are schematic images of a perspective view of a lighting fixture on a pole with a sensor, according to exemplary embodiments.
Figure 7B:
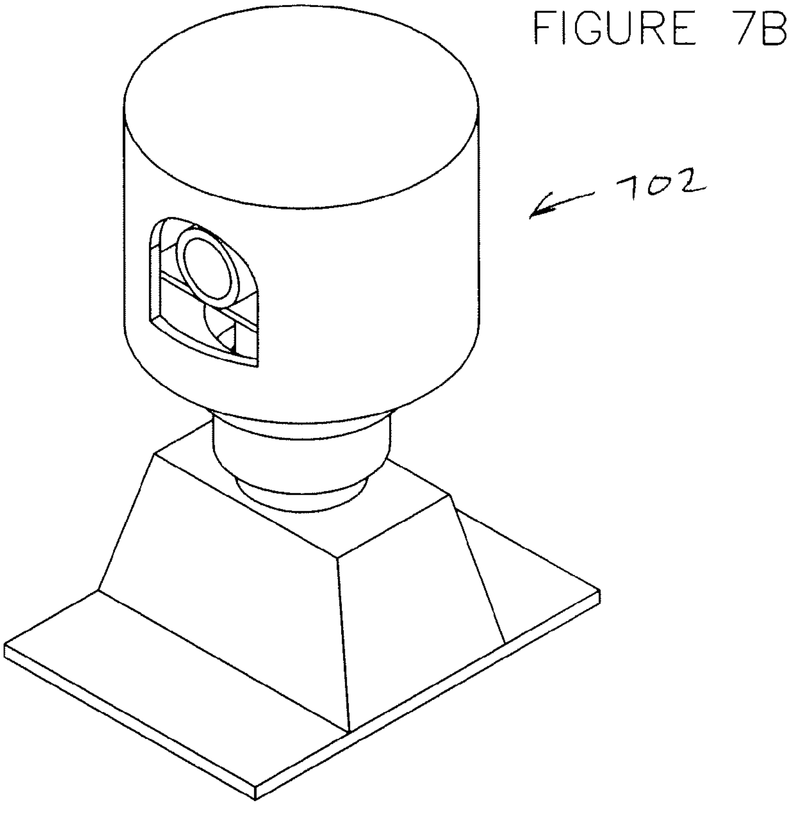
Figure 8A:
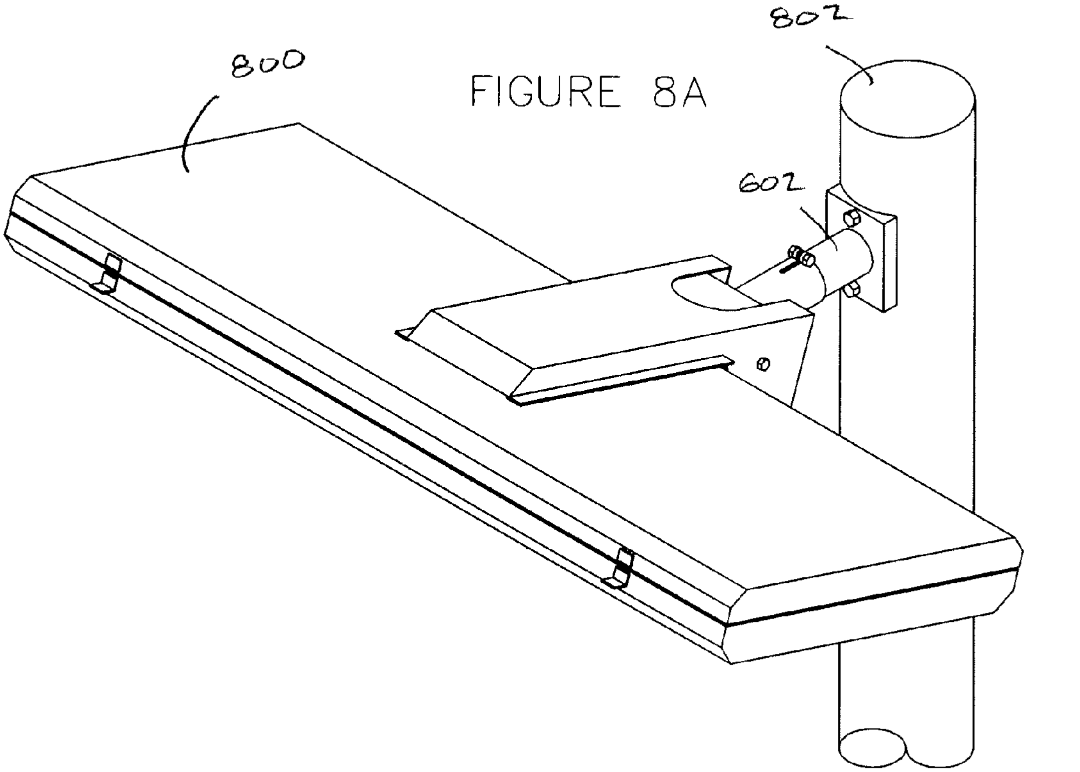
FIGS. 8A-8E are schematic images of a perspective view of adaptors in use for mounting a lighting fixture having a one mounting arrangement on a pole, according to exemplary embodiments.
Figure 8B:
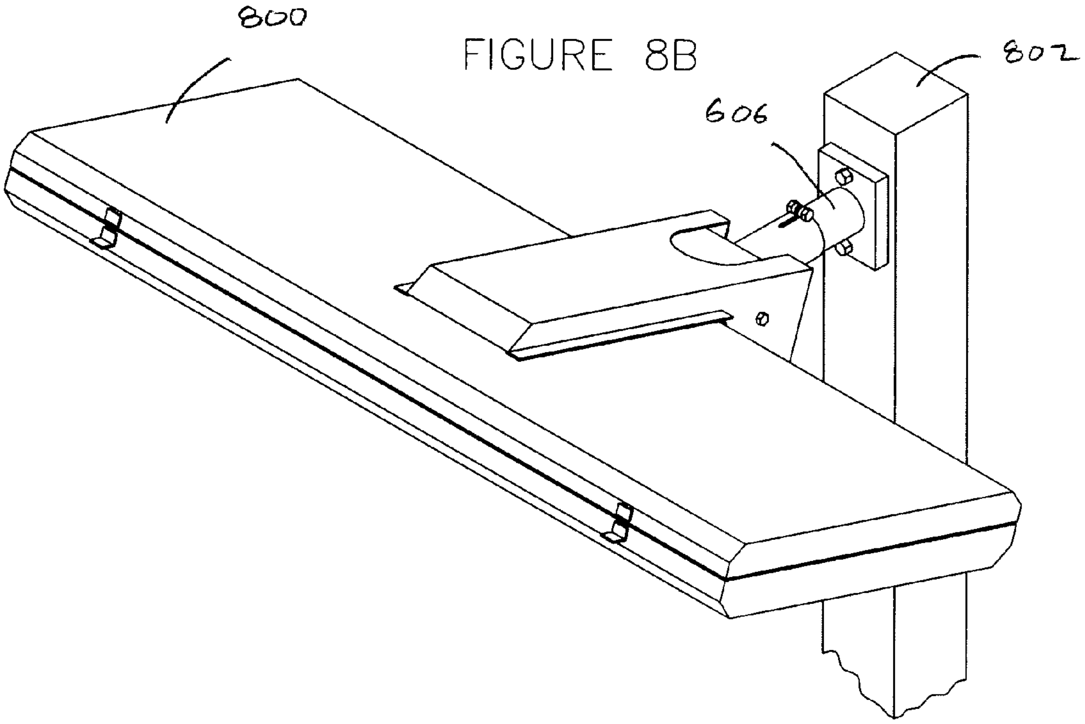
Figure 8C:
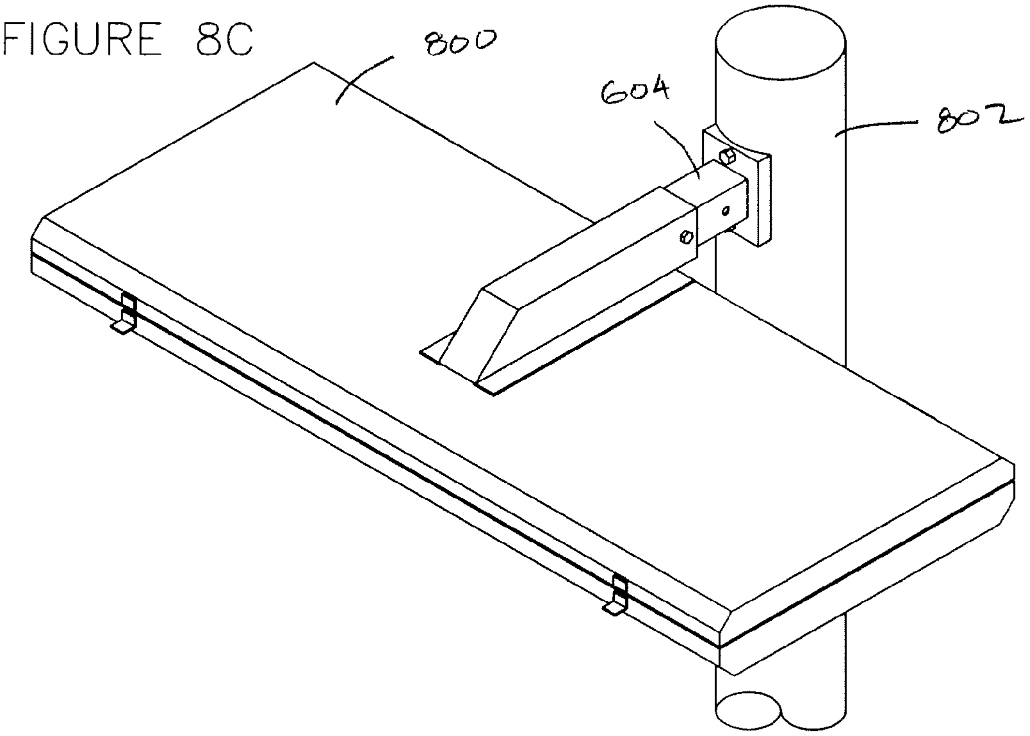
Figure 8D:
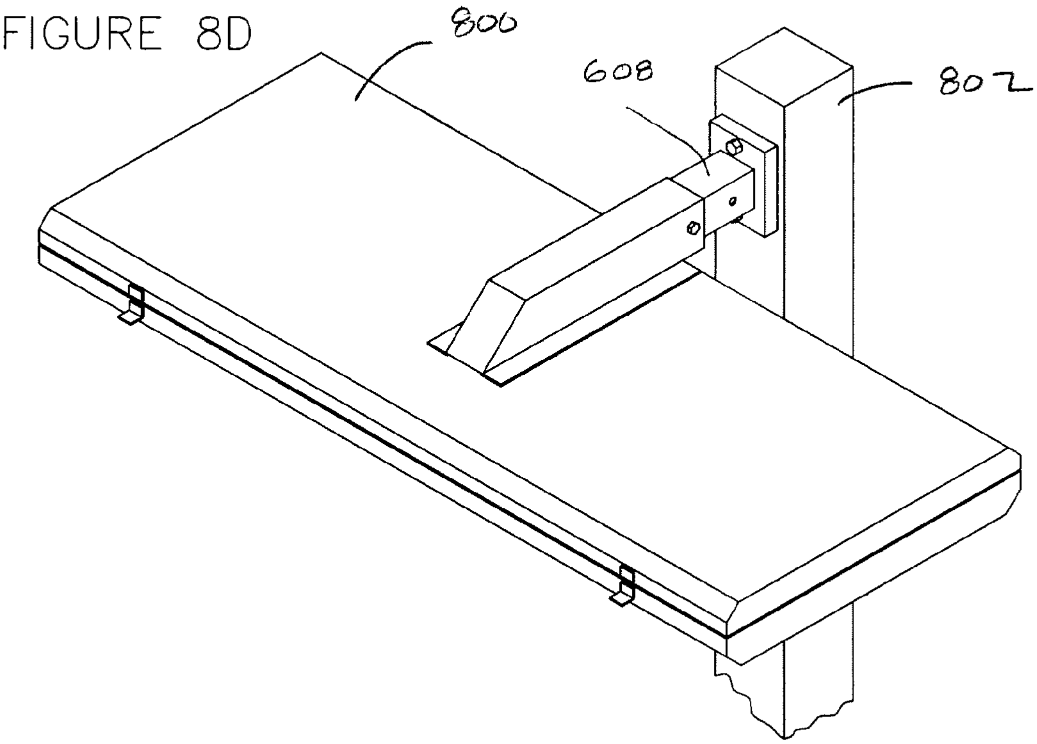
Figure 8E:
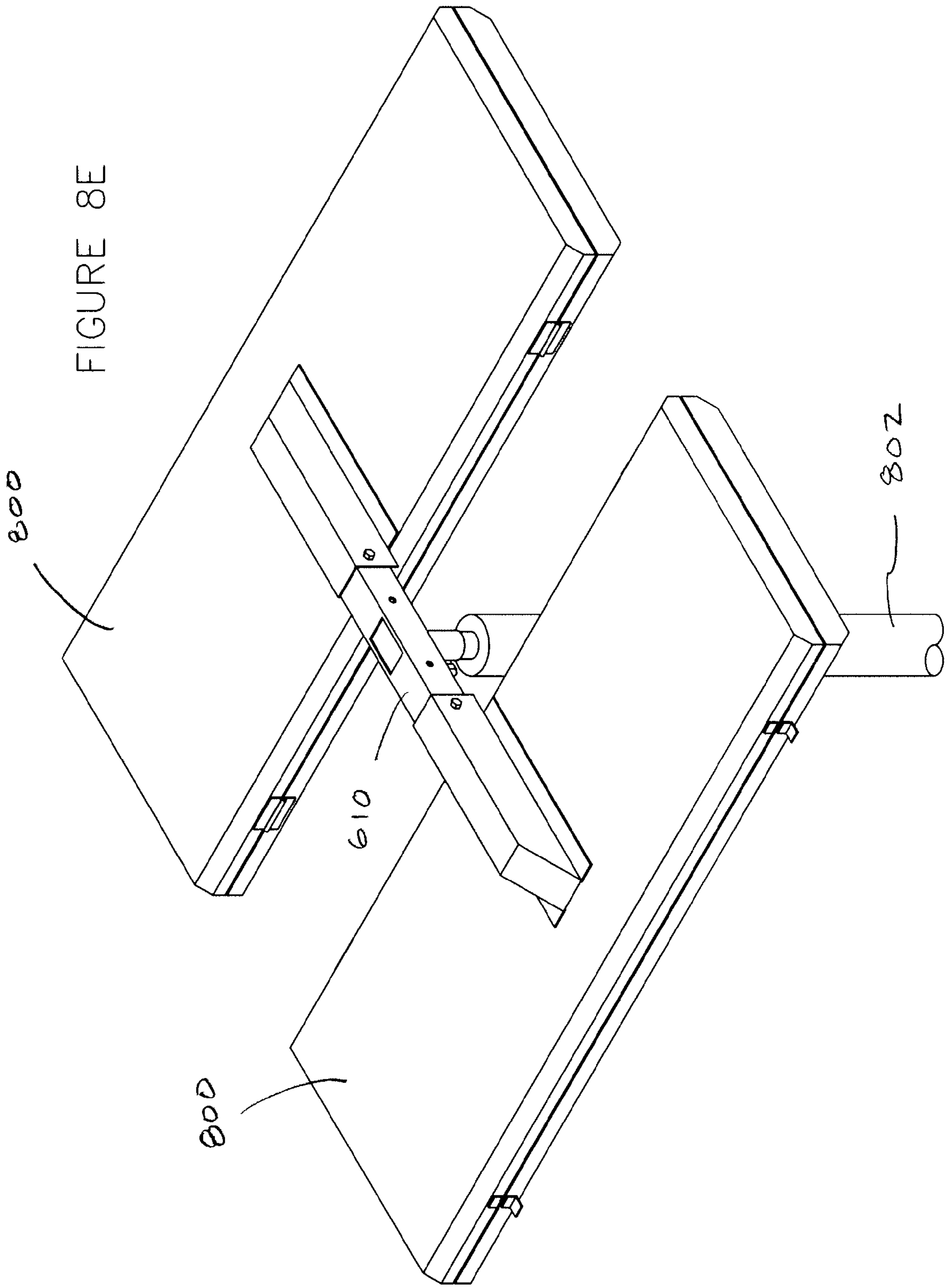

FIGS. 7A and 7B illustrate an outdoor lighting fixture 700 with a "photo eye" 702 (or a "photo eye kit" or the like) for coupling to, for example, an access panel 704 on the lighting fixture mount 706, according to an exemplary embodiment. The photo eye 702 may include the motion sensors, light sensors, or cameras described above with respect to various control activities. The photo eye 702 may also house the control electronics (e.g., processing circuit, logic modules, memory, etc.) associated with such a sensor or camera.

FIGS. 8A-8E show various perspective views of lighting fixtures 800, mounts, brackets, and adapters coupled to various a variety of vertical poles 802 or walls 804.

Figure 9A:
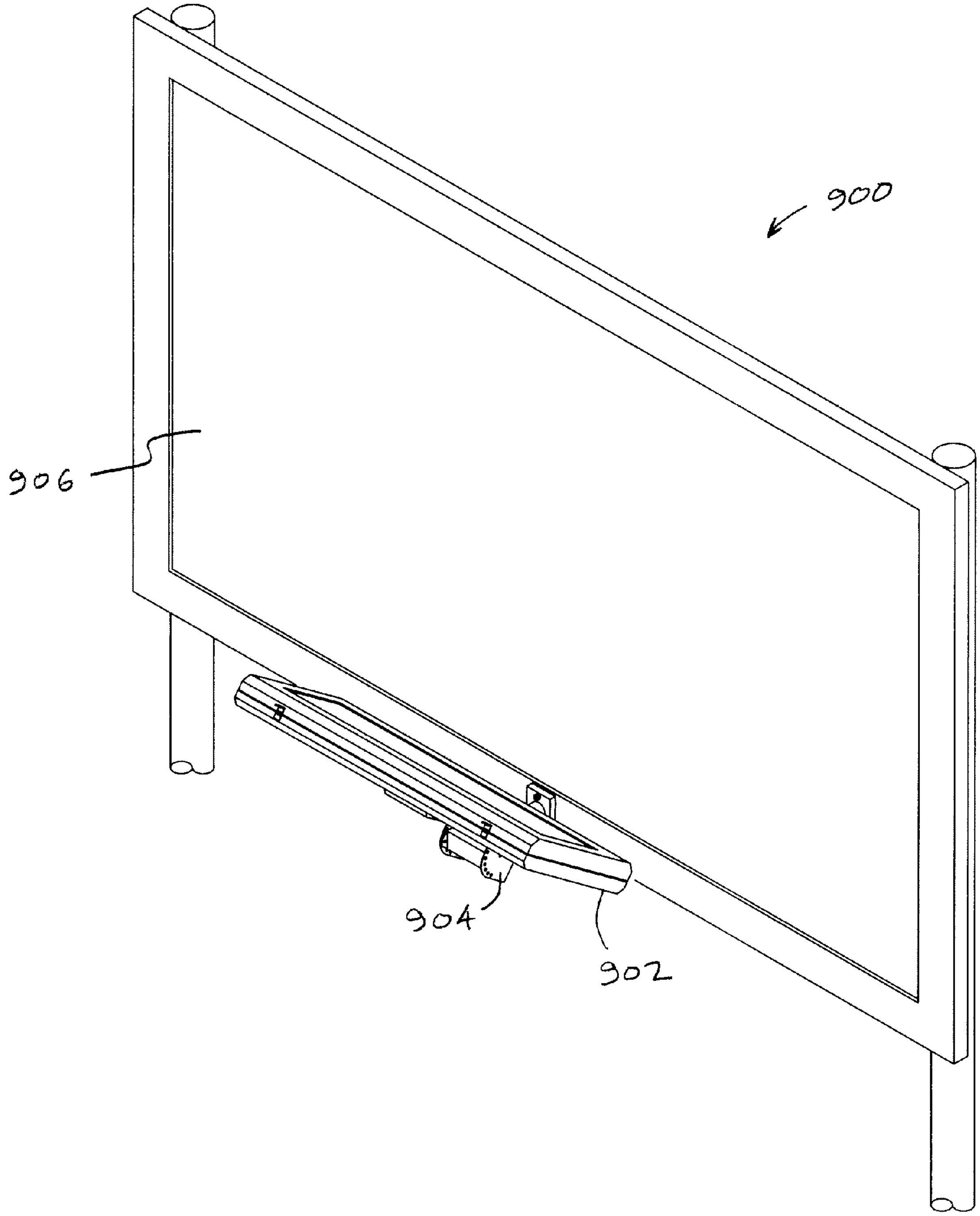
FIGS. 9A-9B are schematic images of a perspective view of a lighting fixture adapted for use with outdoor displays and the like, according to exemplary embodiments.
Figure 9B:
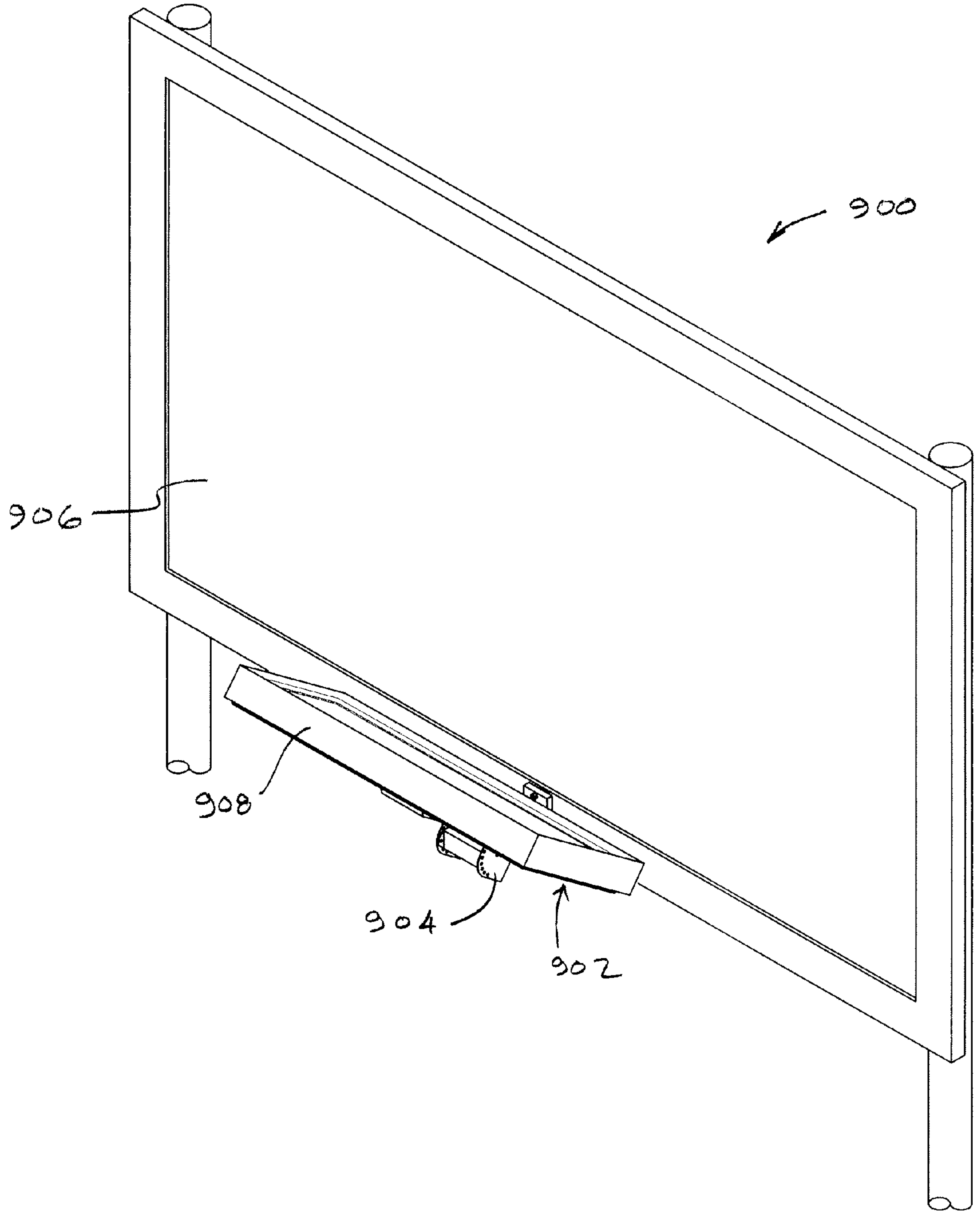

FIG. 9A shows a display (e.g. building facade, billboard, etc.) lighting system 900 according to an exemplary embodiment. System 900 includes a lighting fixture 902 and mounting arrangement 904 (such as those shown in FIGS. 1A-2I) mounted directly to (or separately and adjacent to) a display 906, with the lighting fixture 902 in an inverted position so that the fixture projects light upwardly (e.g. at an angle) towards the display to illuminate the display. Referring to FIG. 9B, fixture 902 include an over-lapping cover 908 configured to enhance the seal of the housing to reduce the likelihood of contaminants entering the housing.

The construction and arrangement of the fixtures, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An outdoor lighting fixture, comprising:

a mounting system configured for coupling to an existing outdoor lamp pole;

a housing coupled to the mounting system and configured to at least partially surround at least one lamp;

a wireless transceiver coupled to at least one of the mounting system and the housing; and a processing circuit coupled to the wireless transceiver;

wherein the processing circuit is configured to compile a log of events for the lamp, and wherein the processing circuit is configured to transmit data based on information from the log to at least one remote source via radio frequency communications, wherein the processing circuit is configured to control the on/off state of the at least one ballast using at least one of a timer, a photocell, and a command input.

2. The outdoor lighting fixture of claim 1, wherein the processing circuit is electrically coupled to a relay configured to provide power to at least one ballast for the fluorescent lamp.

3. The outdoor lighting fixture of claim 1, wherein the housing is configured to at least partially surround a first lamp set and a second lamp set.

4. The outdoor lighting fixture of claim 3, wherein the first lamp set is a primary lamp set and the second lamp set is a backup lamp set.

5. The outdoor lighting fixture of claim 3, wherein the circuit is configured to cause the first lamp set to illuminate by default and to determine when the first lamp set has reached an end of life.

6. The outdoor lighting fixture of claim 5, wherein the circuit is further configured to cause the second lamp set to illuminate rather than the first lamp set based on the determination that the first lamp set has reached the end of life.

7. The outdoor lighting fixture of claim 1, wherein the housing includes at least one vent configured to allow moisture to escape from the housing.

8. The outdoor lighting fixture of claim 7, wherein the vent is controlled by an element that allows the moisture to escape from the housing while preventing water from entering the housing when a vacuum develops within the housing.

9. The outdoor lighting fixture of claim 1, wherein the transceiver is configured to receive a command input from a remote source and the processing circuit is configured to implement the command input.

10. The system of claim 1, wherein the mounting system comprises a compression sleeve configured to receive the existing outdoor lamp pole and to tighten around the existing outdoor lamp pole.

11. The system of claim 10, wherein the compression sleeve comprises a tapered end configured to couple to a plurality of different outdoor lamp poles, each outdoor lamp pole having a different diameter.

12. The system of claim 10, wherein the compression sleeve comprises a fastener configured to tighten the compression sleeve around the existing outdoor lamp pole.

13. The system of claim 10, wherein the compression sleeve comprises a hollow cylindrical portion having an inner circumferential surface configured to engage an outer circumferential surface of the existing outdoor lamp pole when the compression sleeve receives the existing outdoor lamp pole.

14. The system of claim 10, wherein a longitudinal axis of the compression sleeve extends along a length of the housing.

15. The system of claim 10, wherein the compression sleeve comprises an open end configured to fit over an end of the existing outdoor lamp pole.

16. The system of claim 1, wherein the mounting system comprises at least one of: a compression sleeve, a two-piece clamp, a saddle clamp, or one or more arms that bolt to the existing outdoor lamp pole.

17. The system of claim 1, wherein each logged event comprises an event identifier indicating an action performed by the lamp and a timestamp indicating a time at which the action occurs.

* * * * *

UNITED STATES PATENT AND TRADEMARK OFFICE

CERTIFICATE OF CORRECTION

PATENT NO. : 8,866,582 B2
APPLICATION NO. : 12/875930
DATED : October 21, 2014
INVENTOR(S) : Neal R. Verfuerth and Kenneth J. Wetenkamp It is certified that error appears in the above-identified patent and that said Letters Patent is hereby corrected as shown below:

In the Claims

Claim 2:

Column 16, line 49, delete “fluorescent”

Signed and Sealed this
Twenty-first Day of July, 2015

Michelle K. Lee

Michelle K. Lee
*Director of the United States Patent and Trademark Office*